United States Patent [19]

Ushioda

[11] Patent Number: 5,835,893
[45] Date of Patent: Nov. 10, 1998

[54] CLASS-BASED WORD CLUSTERING FOR SPEECH RECOGNITION USING A THREE-LEVEL BALANCED HIERARCHICAL SIMILARITY

[75] Inventor: Akira Ushioda, Kawasaki, Japan

[73] Assignee: ATR Interpreting Telecommunications Research Labs, Kyoto, Japan

[21] Appl. No.: 634,705

[22] Filed: Apr. 18, 1996

[30] Foreign Application Priority Data

Feb. 15, 1996 [JP] Japan ................................ 8-027809

[51] Int. Cl.$^6$ ............................................. G10L 3/00
[52] U.S. Cl. ............................. 704/257; 704/9; 704/10; 704/256
[58] Field of Search ...................... 395/2.65, 2.66, 395/759, 760; 704/256, 257, 9, 10

[56] References Cited

U.S. PATENT DOCUMENTS 5,040,127  8/1991  Gerson ................................... 395/2.66

OTHER PUBLICATIONS

Lalit R. Bahl, Peter F. Brown, Peter V. deSouza, and Robert L. Mercer, "A Tree–Based Statistical Language Model for Natural Language Speech Recognition", IEEE Trans. on ASSP, vol. 37, No. 7, pp. 1001–1008, Jul. 1989.

Ave Wrigley, "Parse Tree N–Grams for Spoken Language Modeling," IEE Colloquium No. 092, Grammatical Inference: Theory, Application and Alternatives, 1993.

Masafumi Tamoto and Takeshi Kawabata, "Clustering Word Category Based in Binomial Posteriori Co–Occurrence Distribution", Proc. IEEE ICASSP 95, pp. 165–168, May 1995.

Klaus Ries, Finn Dag Buo, and Ye–Yi Wang, "Improved Langauge Modeling by Unsupervised Acquisition of Structure," IEEE ICASSP 95, pp. 193–196, May 1995.

Sven Martin, Jorg Liermann, and Hermann Ney, "Algorithms for Bigram and Trigram Word Clustering," Proc. 4th European Conf. on Speech Comm. and Technology (Eurospeech 95), pp. 1253–1256, Sep. 1995.

Joerg P. Ueberla, "More Efficient Clustering of N–Grams for Statistical Language Modeling", Proc. 4th European Conf. on Speech Comm. and Technology (Eurospeech 95), pp. 1257–1260, Sep. 1995.

Michele Jardino, "Multilingual Stochastic N–Gram Class Language Models," Proc. IEEE ICASSP 96, pp. 161–163, May 1996.

Jerome R. Bellegarda, John W. Butzberger, Yen–Lu Chow, Noah B. Coccaro, and Devang Naik, "A Novel Word Clustering Algorithm Based on Latent Semantic Analysis," Proc. IEEE ICASSP 96, pp. 172–175, May 1996.

Azarshid Farhat, Jean–Francois Isabelle, and Douglas O'Shaughnessy, "Clustering Words for Statistical Language Models Based on Contextual Word Similarity," IEEE ICASSP 96, pp. 180–183, May 1996.

(List continued on next page.)

*Primary Examiner*—Allen R. MacDonald
*Assistant Examiner*—Tālivaldis Ivars Šmits

[57] ABSTRACT

In a word clustering apparatus for clustering words, a plurality of words is clustered to obtain a total tree diagram of a word dictionary representing a word clustering result, where the total tree diagram includes tree diagrams of an upper layer, a middle layer and a lower layer. In a speech recognition apparatus, a microphone converts an input utterance speech composed of a plurality of words into a speech signal, and a feature extractor extracts predetermined acoustic feature parameters from the converted speech signal. Then, a speech recognition controller executes a speech recognition process on the extracted acoustic feature parameters with reference to a predetermined Hidden Markov Model and the obtained total tree diagram of the word dictionary, and outputs a result of the speech recognition.

6 Claims, 18 Drawing Sheets

OTHER PUBLICATIONS

John W. Miller and Fil Alleva, "Evaluation of a Language Model using a Clustered Model Backoff," 4th Intl. Conf. on Spoken Language Processing (ICSLP 96), Oct. 1996.

"Mutual Information–Based Word Clustering", Proceedings on the Symposium of the Training in Natural Language Processing, the Institute of Electronics, Information and Communication Engineers in Japan pp. 104–111, Dec. 30, 1994 by Hideki Kashioka, et al.

"Class–Based n–gram Models of Natural Language", by Peter F. Brown et al, Computational Linguistics vol. 18, No. 4, pp. 467–479, 1992.

"Automatically Acquiring Phrase Structure Using Distributional Analysis", Darpa Workshop on Speech and Natural Language, Harriman, NY pp. 155–159, Feb., 1992 by Eric Brill, et al.

"Improved Clustering Techniques for Class–Based Statistical Language Modelling", Proceedings of European Conference on Speech Communication and Technology, vol., 2, pp. 973–976, Sep. 21, 1993 by Reinhard Kreser and Hermann Ney Missing pp. 973–974.

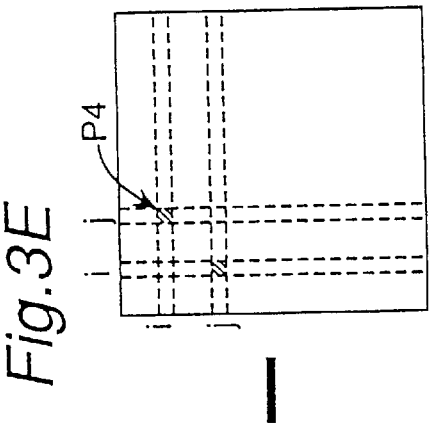
Fig.3E
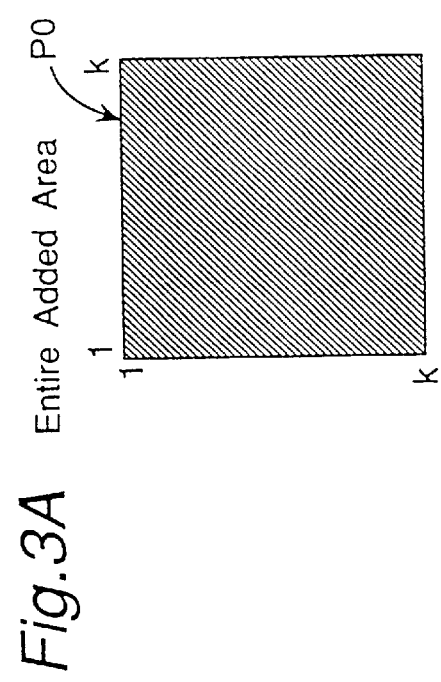
Fig.3B
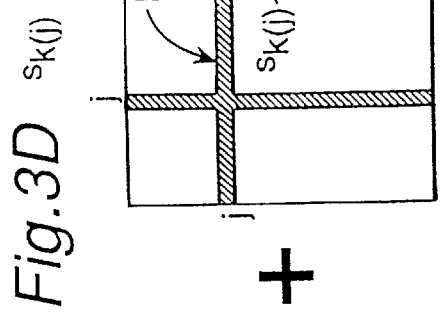
Fig.3D $s_{k(j)}$
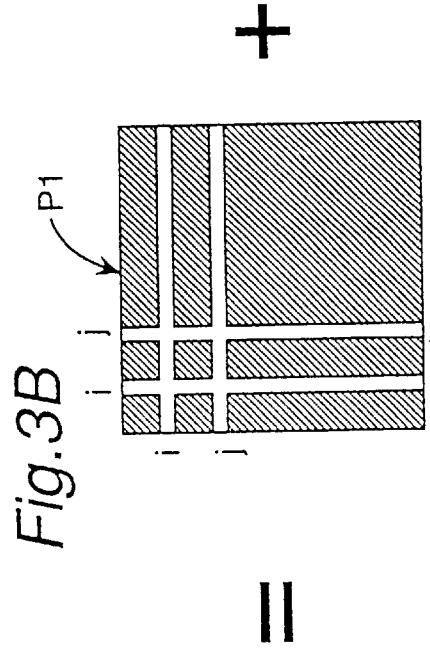
Fig.3A  Entire Added Area
$\{(\ell,m) \mid 1 \leq \ell \leq k, 1 \leq m \leq k\}$
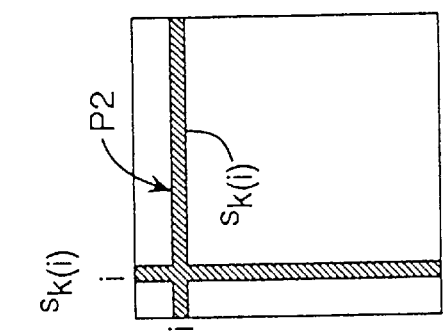
Fig.3C $s_{k(i)}$ Added Area for $L_k(\ell,m)$ Added Area for $L_k^{(i,j)}(\ell,m)$ Fig.5A $Ih_k$
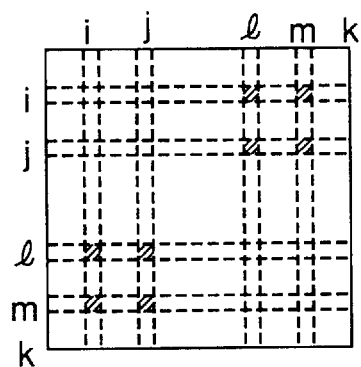
Fig.5B $Ih_k(\ell,m)$
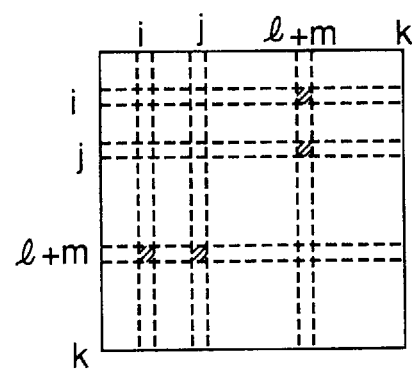
Fig.5C $Ih_{k-1}^{(i,j)}$
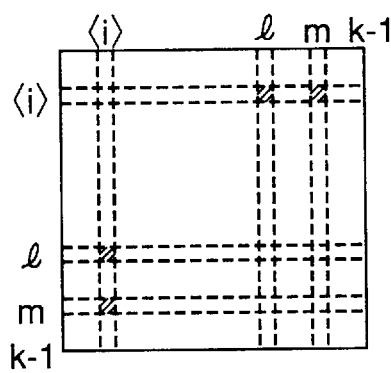
Fig.5D $Ih_{k-1}^{(i,j)}(\ell,m)$
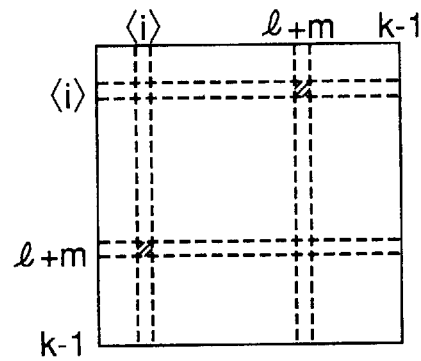

Dendrogram Construction
(Branching Tree Diagram)

Fig. 7  Left Branching Tree Diagram

Fig.8  Sample Subtree Diagram for One Class

Step S21

One Window → Work RAM 52 Stored

Step S23      Step S25

One Window After Merging Process

CLASS-BASED WORD CLUSTERING FOR SPEECH RECOGNITION USING A THREE-LEVEL BALANCED HIERARCHICAL SIMILARITY

BACKGROUND OF THE INVENTION

1. Field of the Invention

The present invention relates to a word clustering apparatus for clustering words; a speech recognition apparatus; a method for clustering words, and in particular, to a word clustering apparatus for clustering words using average mutual information to obtain a total tree diagram representing a word clustering result wherein the word clustering apparatus is for use in a speech recognition apparatus, a morphological analysis apparatus or the like; a speech recognition apparatus comprising the word clustering apparatus; and a method for clustering words using an average mutual information.

2. Description of the Related Art

A system for clustering words is a piece of very important knowledge when smoothly executing processes in a speech recognition apparatus, a morphological analysis apparatus, and a sentence structure analysis apparatus. As a method for constructing such a word clustering system of word dictionary, a method using a mutual information between words based on a great amount of text data (the method referred to as a first prior art hereinafter) has been proposed in, for example, a prior art document of Peter Brown, et. al, "Class-Based n-gram Models of Natural Language", Computational Linguistics, Vol. 18, No. 4, pp. 467–479, 1992". According to this first prior art method, predetermined mutual information is calculated by means of an n-gram model to cluster English words.

However, when clustering English words by means of the clustering method of the first prior art based on the mutual information, there has been such a problem that words which appear at a low frequency are often clustered inappropriately. In order to solve this problem, a word clustering apparatus and a speech recognition apparatus (referred to as a second prior art hereinafter) have been proposed by the present applicant in the Japanese Patent Application No. P07-056918.

The second prior art word clustering apparatus is characterized in comprising:

first clustering means for clustering a plurality of words into a plurality of classes based on a criterion that words having a high rate of its being located adjacent to an identical word are assigned to an identical class taking advantage of the n-gram of each word; and second clustering means for examining or detecting an appearance frequency of a plurality of words clustered by the first clustering means, and clustering the plurality of words into a plurality of classes in a binary tree form so that the predetermined average mutual information is maximized representing a relative frequency rate of a probability when words of a first class and words of a second class which are different from each other appear adjacent to each other, with respect to a product of the appearance frequency of the words of the first class and the appearance frequency of the words of the second class.

In the present case, it is preferable for the second clustering means to examine or detect the appearance frequency of all the words for the plurality of words that have been clustered by the first clustering means, assign the words to a predetermined plurality of N classes in an descending order of appearance frequency, respectively, and cluster two classes having the maximum mutual information out of the N classes into one class so as to cluster the words into (N−1) classes. Among the words which are not assigned to any class, the one word having the maximum appearance frequency is newly assigned to an N-th class, and the above process is repeated until all the words are assigned to the N classes. Among the currently existing classes, two classes having the maximum appearance frequency are clustered into one class, and this process is repeated until the words are clustered into one class. By the above processes, the word clustering process can be executed more stably, thereby allowing a more precise and accurate clustering system to be obtained when automatically obtaining the word clustering system from text data.

When English words are clustered by the clustering method based on the mutual information of the first prior art, those words each having a low appearance frequency are often inappropriately clustered. The reason is that no hierarchical structure that yields a balanced result of separation is achieved.

Furthermore, according to the above-mentioned second prior art, the plurality of words are clustered into a plurality of classes in a binary tree form so that the predetermined average mutual information is maximized representing the relative frequency rate of an appearance frequency when words of the first class and words of the second class which are different from each other appear adjacent to each other, with respect to the product of the appearance frequency of the words of the first class and the appearance frequency of the words of the second class. Therefore, with regard to the words of the first class and the words of the second class, a locally optimized word clustering result can be obtained, however, there is such a problem that a totally optimized word clustering result cannot be obtained.

SUMMARY OF THE INVENTION

An essential object of the present invention is therefore to provide a word clustering apparatus capable of obtaining a word clustering result which has a balanced hierarchical structure obtained by a word clustering process and which is totally optimized.

Another object of the present invention is to provide a speech recognition apparatus comprising a word clustering apparatus capable of obtaining a word clustering result which has a balanced hierarchical structure obtained by a word clustering process and which is totally optimized, and the speech recognition apparatus being capable of recognizing an utterance speech with an improved speech recognition rate.

A further object of the present invention is to provide a method for clustering words capable of obtaining a word clustering result which has a balanced hierarchical structure obtained by a word clustering process and which is totally optimized.

In order to achieve the above-mentioned objective, according to one aspect of the present invention, there is provided a word clustering apparatus for clustering a plurality of words and obtaining a total tree diagram representing a word clustering result, said total tree diagram including tree diagrams of an upper layer, a middle layer and a lower layer, said word clustering apparatus comprising:

first storage means for storing class words within one window;

second storage means for storing a plurality of c classes of the middle layer;

third storage means for storing the tree diagram of the upper layer;

fourth storage means for storing the tree diagram of the lower layer;

fifth storage means for storing the total tree diagram;

first control means for detecting an appearance frequency of a plurality of v words which are different from one another in text data including a plurality of words, for arranging the v words in a descending order of appearance frequency, and for assigning the v words to a plurality of v classes;

second control means for storing as class words within one window into said first storage means, words of (c+1) classes having a high appearance frequency, the number (c+1) smaller than v, among the v words of the plurality of v classes assigned by said first control means;

third control means, in response to the class words within one window stored in said first storage means, for clustering the class words within one window into a plurality of c classes in a predetermined binary tree form, so that a predetermined average mutual information is maximized representing a relative frequency rate, of a probability when words of a first class and words of a second class which are different from each other appear adjacent to each other, with respect to a product of the appearance frequency of the words of the first class and the appearance frequency of the words of the second class, and for storing the plurality of clustered c classes as a plurality of c classes of the middle layer, into said second storage means;

fourth control means, in response to the plurality of c classes of the middle layer stored in said second storage means, for clustering the words of the plurality of clustered c classes of the middle layer in a binary tree form until the words of the middle layer are clustered into one class so that the average mutual information is maximized, and for storing a result of the clustering as the tree diagram of the upper layer into said third storage means;

fifth control means, in response to the plurality of words in each of the plurality of c classes of the middle layer stored in said second storage means, for clustering the plurality of words of each class of the middle layer in a binary tree form until the words of each class of the middle layer are clustered into one class every class of the plurality of c classes of the middle layer stored in said second storage means so that the average mutual information is maximized, and for storing a result of the clustering for each class as the tree diagram of the lower layer into said fourth storage means; and sixth control means for obtaining the total tree diagram including the tree diagrams of the upper layer, the middle layer and the lower layer by connecting the tree diagram of the lower layer stored in said fourth storage means to the plurality of c classes of the middle layer stored in said second storage means, and connecting the tree diagram of the upper layer stored in said third storage means to the plurality of c classes of the middle layer stored in said second storage means, and for storing a resulting total tree diagram as a word clustering result into said fifth storage means.

In the above-mentioned word clustering apparatus, when a class exists outside the one window stored in said first storage means or when the number of classes existing within the one window is not c, said third control means preferably inserts words of a class which exists outside the current window and has a maximum appearance frequency into said window, and thereafter clusters the class words within one window into a plurality of c classes in the binary tree form.

According to another aspect of the present invention, there is provided a speech recognition apparatus comprising:

word clustering means for clustering a plurality of words and obtaining a total tree diagram of a word dictionary representing a word clustering result, said total tree diagram including tree diagrams of an upper layer, a middle layer and a lower layer;

microphone means for converting an input utterance speech composed of a plurality of words into a speech signal;

feature extracting means for extracting predetermined acoustic feature parameters from the speech signal converted by said microphone means; and speech recognition means for executing a speech recognition process on the acoustic feature parameters extracted by said feature extracting means, with reference to a predetermined Hidden Markov Model and the total tree diagram of the word dictionary obtained by said word clustering means, and for outputting a result of the speech recognition.

In the above-mentioned recognition apparatus, said word clustering means preferably comprises:

first storage means for storing class words within one window;

second storage means for storing a plurality of c classes of the middle layer;

third storage means for storing the tree diagram of the upper layer;

fourth storage means for storing the tree diagram of the lower layer;

fifth storage means for storing the total tree diagram;

first control means for detecting an appearance frequency of a plurality of v words which are different from one another in text data including a plurality of words, for arranging the v words in a descending order of appearance frequency, and for assigning the v words to a plurality of v classes;

second control means for storing as class words within one window into said first storage means, words of (c+1) classes having a high appearance frequency, the number (c+1) smaller than v, among the v words of the plurality of v classes assigned by said first control means;

third control means, in response to the class words within one window stored in said first storage means, for clustering the class words into a plurality of c classes in a predetermined binary tree form, so that a predetermined average mutual information is maximized representing a relative frequency rate of a probability when words of a first class and words of a second class which are different from each other appear adjacent to each other, with respect to a product of the appearance frequency of the words of the first class and the appearance frequency of the words of the second class, and for storing the plurality of clustered c classes as a plurality of c classes of the middle layer, into said second storage means;

fourth control means, in response to the plurality of c classes of the middle layer stored in said second storage means, for clustering the words of the plurality of clustered c classes of the middle layer in a binary tree form until the words of the middle layer are clustered into one class so that the average mutual information is maximized, and for storing a result of the clustering as the tree diagram of the upper layer into said third storage means;

fifth control means, in response to the plurality of words in each of the plurality of c classes of the middle layer stored in said second storage means, for clustering the plurality of words of each class of the middle layer in a binary tree form until the words of each class of the middle layer are clustered into one class every class of the plurality of c classes of the middle layer stored in said second storage means so that the average mutual information is maximized, and for storing a result of the clustering for each class as the tree diagram of the lower layer into said fourth storage means; and sixth control means for obtaining the total tree diagram including the tree diagrams of the upper layer, the middle layer and the lower layer by connecting the tree diagram of the lower layer stored in said fourth storage means to the plurality of c classes of the middle layer stored in said second storage means, and connecting the tree diagram of the upper layer stored in said third storage means to the plurality of c classes of the middle layer stored in said second storage means, and for storing a resulting total tree diagram as a word clustering result into said fifth storage means.

In the above-mentioned speech recognition apparatus, when a class exists outside the one window stored in said first storage means or when the number of classes existing within the one window is not c, said third control means preferably inserts words of a class which exists outside the current window and has a maximum appearance frequency into said window, and thereafter clusters the class words within one window into a plurality of c classes in the binary tree form.

According to a further aspect of the present invention, there is provided a method for clustering a plurality of words and obtaining a total tree diagram representing a word clustering result, said total tree diagram including tree diagrams of an upper layer, a middle layer and a lower layer, said method including the following steps:

detecting an appearance frequency of a plurality of v words which are different from one another in text data including a plurality of words, arranging the v words in a descending order of appearance frequency, and assigning the v words to a plurality of v classes;

storing as class words within one window into first storage means, words of (c+1) classes having a high appearance frequency, the number (c+1) smaller than v, among the v words assigned into the plurality of v classes;

in response to the class words within one window stored in said first storage means, clustering the class words within one window into a plurality of c classes in a predetermined binary tree form, so that a predetermined average mutual information is maximized representing a relative frequency rate of a probability when words of a first class and words of a second class which are different from each other appear adjacent to each other, with respect to a product of the appearance frequency of the words of the first class and the appearance frequency of the words of the second class, and storing the plurality of clustered c classes as a plurality of c classes of the middle layer, into said second storage means;

in response to the plurality of c classes of the middle layer stored in said second storage means, clustering the words of the plurality of clustered c classes of the middle layer in a binary tree form until the words of the middle layer are clustered into one class so that the average mutual information is maximized, and storing a result of the clustering as the tree diagram of the upper layer into third storage means;

in response to the plurality of words in each of the plurality of c classes of the middle layer stored in said second storage means, clustering the plurality of words of each class of the middle layer in a binary tree form until the words of each class of the middle layer are clustered into one class every class of the plurality of c classes of the middle layer stored in said second storage means so that the average mutual information is maximized, and storing a result of the clustering for each class as the tree diagram of the lower layer into said fourth storage means; and obtaining the total tree diagram including the tree diagrams of the upper layer, the middle layer and the lower layer by connecting the tree diagram of the lower layer stored in said fourth storage means to the plurality of c classes of the middle layer stored in said second storage means, and connecting the tree diagram of the upper layer stored in said third storage means to the plurality of c classes of the middle layer stored in said second storage means, and storing a resulting total tree diagram as a word clustering result into said fifth storage means.

In the above-mentioned method, when a class exists outside the one window stored in said first storage means or when the number of classes existing within the one window is not c, said clustering the class words within one window step preferably includes the following steps of:

inserting words of a class which exists outside the current window and has a maximum appearance frequency into said window, and thereafter clustering the class words within one window into a plurality of c classes in the binary tree form.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 3A, 3B, 3C, 3D and 3E are schematic diagrams of class bigram tables showing a summation region and a summation and subtraction process of a word clustering process executed by a word clustering processor shown in FIGS. 1 and 2, wherein FIG. 3A shows an entire added area P0, FIG. 3B shows an area P1, FIG. 3C shows an area P2, FIG. 3D shows an area P3, and FIG. 3E shows an area P4;

FIG. 5A is a schematic diagram of a class bigram table representing an AMI $Ih_k$ after a merging process in the word clustering process;

FIG. 5B is a schematic diagram of a class bigram table representing an AMI $Ih_k$ (l, m) after the merging process in the word clustering process;

FIG. 5C is a schematic diagram of a class bigram table representing an AMI $Ih_{k-1}^{(i,j)}$ after the merging process in the word clustering process;

FIG. 5D is a schematic diagram of a class bigram table representing an AMI $Ih_{k-1}^{(i,j)}$ (l, m) after the merging process in the word clustering process;

DETAILED DESCRIPTION OF THE PREFERRED EMBODIMENTS

Preferred embodiments of the present invention will be described below with reference to the accompanying drawings.

Figure 1:
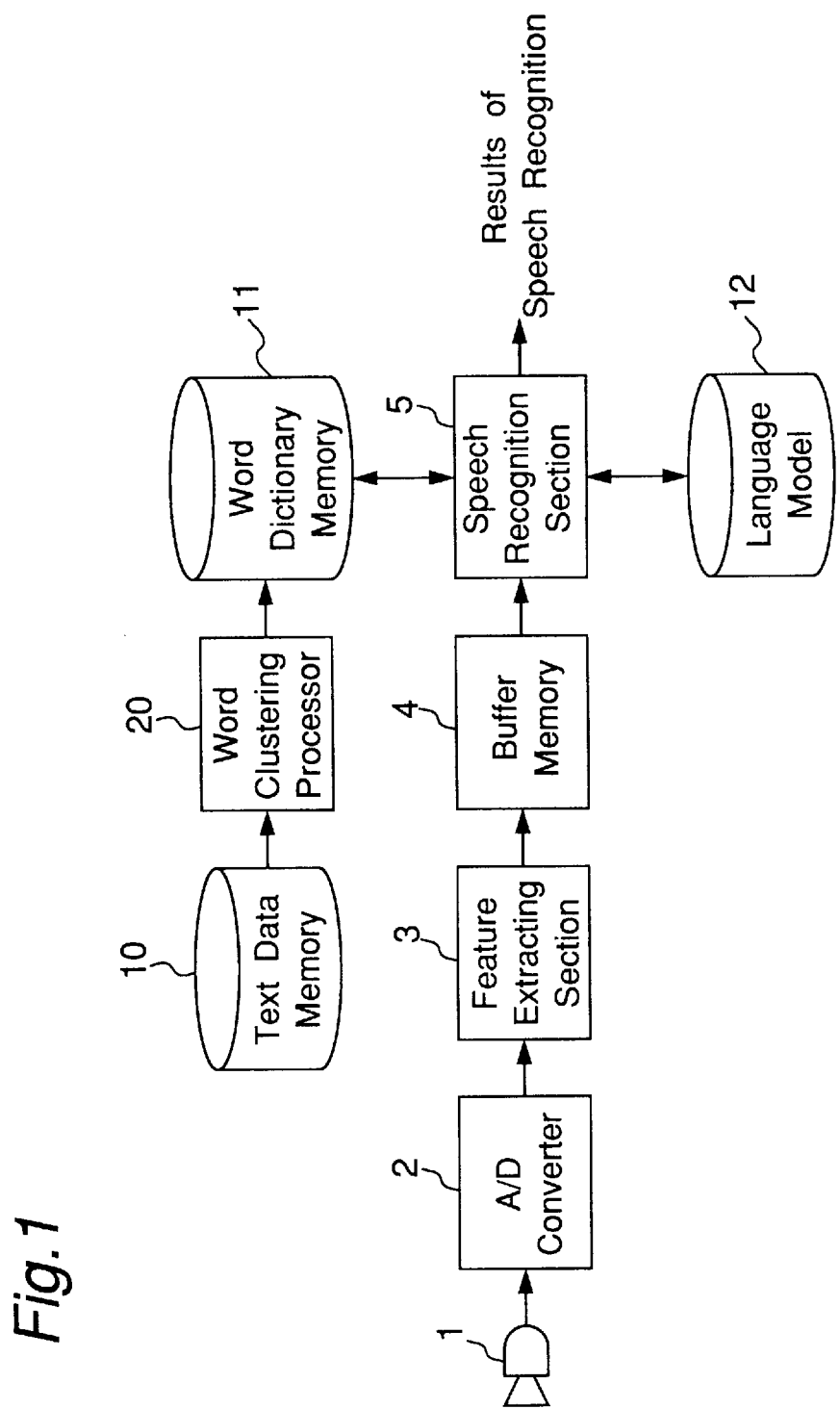
FIG. 1 is a block diagram of a speech recognition apparatus according to a first preferred embodiment of the present invention.

FIG. 1 is a block diagram of a speech recognition apparatus according to a first preferred embodiment of the present invention. The present speech recognition apparatus of the first preferred embodiment comprises a word clustering processor 20 which has the following functions of:

(a) clustering words having a relatively low appearance frequency in a text data stored in a text data memory 10 based on such a criterion that those words having a high rate of its being located adjacent to an identical word are assigned to an identical class;

(b) thereafter clustering the word clustering result into three layers of a middle layer, an upper layer and a lower layer;

(c) executing a word clustering process separately for each of the layers in a predetermined order of the middle layer, the upper layer and the lower layer, by means of predetermined average mutual information that is a global or total cost function with regard to all the words in the text data; and (d) storing the clustered result as a word dictionary into a word dictionary memory 11.

Word Clustering Process

First of all, the method for clustering words of the present first preferred embodiment will be described in contrast to the first prior art method. The method of the present invention is obtained by correcting and greatly developing and remarkably improving the first prior art method disclosed in the reference document of the prior art. First of all, differences between the equations of the first prior art and equations of the present preferred embodiment will be described, and then, the method for clustering words will be described. In the present case, in order to compare the present preferred embodiment with the first prior art, the same reference numerals as those of the first prior art are used.

First of all, a clustering method based on the mutual information will be described. It is herein assumed that text data of T words, vocabulary of V words, and a vocabulary partition function $\pi$ exist, where the vocabulary partition function $\pi$ is a mapping function representing a partition mapping from the vocabulary V to a set C of classes of words in the vocabulary. In the first prior art, the likelihood $L(\pi)$ of bigram class model generating the text data comprised of a plurality of words is given by the following equation (1):

$$L(\pi) = -H + I \qquad (1)$$

where H is an entropy of the mono-gram word distribution, and I is an average mutual information (referred to as an AMI hereinafter) of adjacent two classes $C_1$ and $C_2$ different from each other in the text data, and they can be calculated according to the following equation (2):

$$I = \sum_{C_1, C_2} Pr(C_1, C_2) \log \frac{Pr(C_1|C_2)}{Pr(C_1)} \qquad (2)$$

$$= \sum_{C_1, C_2} Pr(C_1, C_2) \log \frac{Pr(C_1, C_2)}{Pr(C_1) \cdot Pr(C_2)}$$

where $Pr(C_1)$ is a probability of appearance of a word of the first class $C_1$, $Pr(C_2)$ is a probability of appearance of words of the second class $C_2$, $Pr(C_1|C_2)$ is a conditional probability of appearance of words of the first class $C_1$ after the appearance of words of the second class $C_2$, and $Pr(C_1, C_2)$ is a probability of appearance of the words of the first class $C_1$ and the words of the second class $C_2$ which appear adjacent to each other.

Therefore, the AMI expressed by the equation (2) represents a relative frequency rate obtained by dividing the probability of appearance of the words of the first class $C_1$ and the words of the second class $C_2$ which are different from each other and appear adjacent to each other, by the product of the probability of appearance of the words of the first class $C_1$ and the probability of appearance of the words of the second class $C_2$.

Since the entropy H is a value independent of the mapping function $\pi$, a mapping function that maximizes the AMI also simultaneously maximizes the likelihood $L(\pi)$ of the text data. Therefore, the AMI can be used as an objective function for construction of classes of words.

The first prior art clustering method based on the mutual information employs a bottom-up merging procedure effected from the lower layer through the middle layer to the upper layer. In the initial stage, each word is assigned to its own distinct class. Then, a pair of two classes merging of which induces the minimum AMI reduction among all pairs of classes is investigated or searched, the two classes of the pair are merged with each other, and the merging process is repeated until the number of the classes is reduced to a predefined number c. According to the basic algorithm of the first prior art, for example, an operating time complexity or an operating time cost executed by a digital computer is of an order proportional to $V^5$ (the fifth power of the number of V words of the vocabulary) when the process is directly executed in the following manner, and this is expressed as $O(V^5)$. In the present case, the operating time complexity is an index representing how much operating time is required.

<Step A1> There are in total (V−c) merging steps, when the operating time complexity is of an order of 0 (V) proportional to the number of V words of the vocabulary.

<Step A2> After "n" merging steps, (V−n) classes remain. In the next merging step, it is required to execute $_{v-n}C_2$ (i.e., the number of combinations when two classes are taken from V−n classes) merging test or trial (referred to as a trial hereinafter because, among a plurality of merging steps executed in this case, only one step of them is subjected to the actual merging process to be reflected on the word clustering result) for investigation. Only one of the above trials will be made effective in the subsequent merging process. Therefore, the operating time complexity in this stage is of an order of $O(V^2)$ proportional to the second power $V^2$ of the number of words of the vocabulary.

<Step A3> One trial merging process at n-th step involves summations of $(V-n)^2$ terms or classes for the calculation of AMI according to the equation (2). Therefore, the operating time complexity in this case is of an order of $O(V^2)$ proportional to the second power $V^2$ of the number of words of the vocabulary.

Therefore the total operating time complexity executed by, for example, a digital computer is of an order of $O(V^5)$ proportional to the fifth power $V^5$ of the number of words.

However, by eliminating redundant calculation as described later, the operating time complexity can be reduced to an order of $O(V^3)$ proportional to the third power $V^3$ of the number of V words of the vocabulary. In short, according to the following method of the present invention, the process of the step A3 can be executed in a predetermined constant time.

<Step B1> Only those classes in the equation (2) whose values have been changed by the previous merging process are computed. Therefore, the operating time complexity changes from the order of $O(V^2)$ in the first prior art to an order of $O(V)$.

<Step B2> The result of all the trial merging process at the previous merging step is stored. Therefore, the operating time complexity changes from the order of $O(V)$ in the first prior art to a predetermined order of $O(1)$ which does not depend on the number of V words of the vocabulary.

Supposed that, starting with the vocabulary of V classes, we have already (V−k) times of merging processes executed, and then k classes, $C_k(1), C_k(2), \ldots, C_k(k)$ remain. The AMI at this stage is calculated by the following equations (3) and (4).

$$I_k = \sum_{l,m} q_k(l,m) \quad (3)$$

$$q_k(l,m) = p_k(l,m) \log \frac{p_k(l,m)}{pl_k(l)pr_k(m)} \quad (4)$$

where $P_k(l, m)$ is a probability that a word in the class $C_k(l)$ is followed by a word in the class $C_k(m)$, and the probability $p_k(l, m)$ is expressed by the following equations (5) and (6). It is to be noted that, in the present specification and drawings, l is used for l (small letter of el) denoting that l=l for the sake of clarifying expressions.

$$p_k(l,m) = Pr(C_k(l), C_k(m)), \text{ and} \quad (5)$$

$$pl_k(l) = \sum_m P_k(l,m) \quad (6)$$

$$pr_k(m) = \sum_l P_k(l,m)$$

In the equation (3), the functions $q_k$ are summed over the entire (k×k) class bigram table in which (l, m) cell represents $q_k(l, m)$. Now suppose that we investigate a trial merging process of the classes $C_k(i)$ and $C_k(j)$ and compute the AMI reduction, $L_k(i, j) = I_k - I_k(i, j)$, by this merging process, where $I_k(i, j)$ is the AMI after the merging process.

FIGS. 3A, 3B, 3C, 3D and 3E are schematic diagrams each of a class bigram table showing a summation region and a summation and subtraction process in the word clustering process according to the present invention. In this case, FIGS. 3A to 3E as well as FIGS. 4A and 4B and FIGS. 5A, 5B, 5C and 5D as described later each show a bigram plane of two classes.

As shown in FIGS. 3A to 3E, the summation region P0 of the equation (3) can be represented as a part obtained by subtracting a partial region P4 from the sum of the partial regions P1, P2 and P3. Out of these four parts P1, P2, P3 and P4, the partial region P1 does not change its summation value by the merging process of $C_k(i)$ and $C_k(j)$. Therefore, to calculate the AMI reduction $L_k(i, j)$, the summation region P0 can be reduced from a two dimensional region (i.e., a square region) to a one dimensional region (i.e., a plurality of lines). Hence, the operating time complexity in the step A3 can be reduced from the order of $O(V^2)$ to the order of $O(V)$. Using the notation $C_k(i+j)$ which represents a class created by merging $C_k(i)$ and $C_k(j)$, the AMI reduction $L_k(i, j)$ can be given by the following equations (7) and (8).

$$L_k(i,j) = s_k(i) + s_k(j) - q_k(i,j) - q_k(j,i) - \quad (7)$$
$$\left( \sum_{l \neq i,j} q_k(l, i+j) + \sum_{m \neq i,j} q_k(i+j, m) + q_k(i+j, i+j) \right)$$

where $$s_k(i) = \sum_l q_k(l,i) + \sum_m q_k(i,m) - q_k(i,i) \quad (8)$$

After calculating the AMI reductions $L_k$'s for all the pairs of classes, we choose the pair for which the AMI reduction $L_k$ is the least, for example, choose the class $C_k(i)$ and class $C_k(j)$ (with i<j), and then, we merge that pair and rename the new merged class as $C_{k-1}(i)$, and go on to the next merging step with a new set of (k−1) classes. Except for the class $C_k(i)$ and the class $C_k(j)$, all the classes are indexed the same way after the merging process, that is, we rename $C_k(m)$ as $C_{k-1}(m)$ for $m \neq i, j$. If $j \neq k$, we rename $C_k(k)$ as $C_{k-1}(j)$. If $j=k$, $C_k(k)$ is made to disappear after the merging process.

Further optimization can be executed by storing all the values of AMI reduction $L_k$ in the previous merging step. Suppose that the class pair $(C_k(i), C_k(j))$ was chosen to be merged, that is, $L_k(i, j) \leq L_k(l, m)$ for all pairs $(l, m)$. In the next merging step, we have to calculate AMI reduction $L^{k-1(i,j)}(l, m)$ for all the pairs $(l, m)$. Here we use a superscript $(i, j)$ to indicate that the class pair $(C_k(i), C_k(j))$ was merged in the previous merging step. Now attention should be paid to the difference between the AMI reductions $L_{k-1}^{(i,j)}(l, m)$ and $L_k(l, m)$. That is, $L_{k-1}^{(i,j)}(l, m)$ is the AMI reduction achieved by merging class l and class m after merging class i and class j, whereas $L_k(l, m)$ is the AMI reduction achieved by merging class l and class m without first merging class i and class j. Therefore, the difference between the AMI reduction $L_{k-1}^{(i,j)}(l, m)$ and the AMI reduction $L_k(l, m)$ only comes from the terms or classes which are affected by merging the class pair of $(C_k(i), C_k(j))$.

Figure 4A:
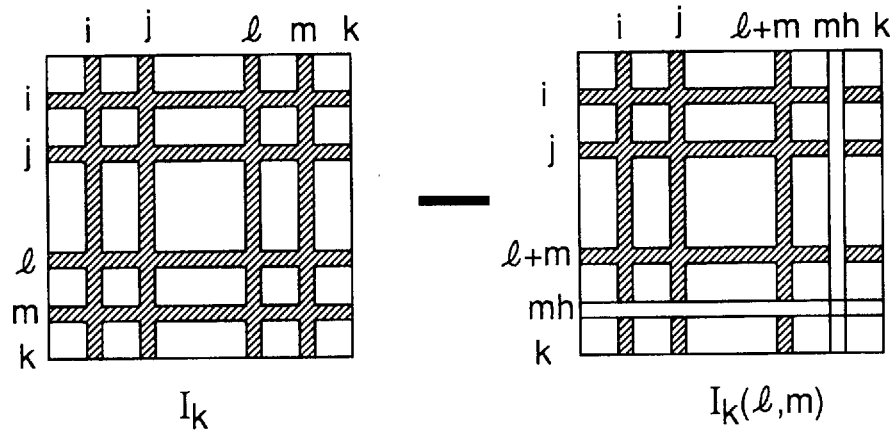
FIG. 4A is a schematic diagram of a class bigram table showing a summation region for AMI reduction Lk (l, m) in the word clustering process.
Figure 4B:
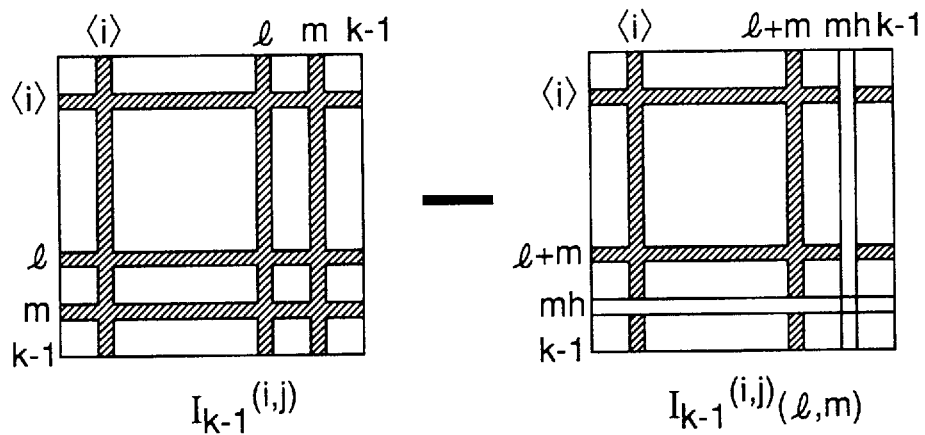
FIG. 4B is a schematic diagram of a class bigram table showing a summation region for AMI reduction $Lk^{(i,j)}$ (l, m) in the word clustering process.

To see the above process graphically with reference to FIGS. 4A and 4B, the summation regions of the class bigram table for the AMI reduction $L_{k-1}^{(i,j)}(l, m)$ and the AMI reduction $L_k(l, m)$ are illustrated in FIGS. 4A and 4B. Because the summation over the region $\{(x,y) | x \neq i,j,l,m$ and $y \neq i,j,l,m\}$ does not change its value by the merging process of class i and class j, or the merging process of class l and class m, that region is omitted in the graphs. Furthermore, as described later in detail, most of the region in the graphs of FIGS. 4A and 4B is cancelled out with each other when we calculate $\{L_{k-1}^{(i,j)}(l, m) - L_k(l, m)\}$, and then, only a several number of point regions remains. Hence, the operating time complexity in the step A3 can be reduced to a constant.

Since $L_k(l, m) = I_k - I_k(l, m)$ and $$L_{k-1}^{(i,j)}(l,m) = I_{k-1}^{(i,j)} - I_{k-1}^{(i,j)}(l,m), \quad (9)$$

$$L_{k-1}^{(i,j)}(l,m) - L_k(l,m)(I_{k-1}^{(i,j)}(l,m) - I_k(l,m)) + (I_{k-1}^{i,j} - I_k).$$

Some part of the summation region of the AMI reduction $I_{k-1}^{(i,j)}(l, m)$ and the AMI reduction $I_k$ are cancelled out with a part of the AMI reduction $I_{k-1}^{(i,j)}$ or a part of the AMI reduction $I_k(l, m)$. Let $Ih_{k-1}^{(i,j)}(l, m)$, $Ih_k(l, m)$, $Ih_{k-1}^{(i,j)}$, and $Ih_k$ denote the values of AMI reductions $I_{k-1}^{(i,j)}(l, m)$, $I_k(l, m)$, $I_{k-1}^{(i,j)}$ and $I_k$, respectively, after all the common terms among them which can be canceled are canceled out. In the present case, there can be given the following relational equations (10) to (14):

$$L_{k-1}^{(i,j)}(l, m) - L_k(l, m)$$
$$= -(Ih_{k-1}^{(i,j)}(l, m) - Ih_k(l, m)) + (Ih_{k-1}^{(i,j)} - Ih_k), \quad (10)$$

where $$Ih_{k-1}^{(i,j)}(l,m) = q_{k-1}(l+m,i) + q_{k-1}(i,l+m) \quad (11)$$

$$Ih_k(l,m) = q_k(l+m,i) + q_k(i,l+m) + q_k(l+m,j) + q_k(j,l+m) \quad (12)$$

$$Ih_{k-1}^{(i,j)} = q_{k-1}(i,l) + q_{k-1}(i,m) + q_{k-1}(l,i) + q_{k-1}(m,i) \quad (13)$$

$$Ih_k = q_k(i,l) + q_k(i,m) + q_k(j,l) + q_k(j,m) + \quad (14)$$
$$q_k(l,i) + q_k(l,j) + q_k(m,i) + q_k(m,j)$$

The summation region of Ih's in the equation (10) are illustrated in FIGS. 5A, 5B, 5C and 5D. According to the first prior art, it seems to us that the second term of the right hand side of the equation (10) may be ignored and only the first term may be used to calculate the AMI reduction $L_{k-1}^{(i,}$ $_j)(l, m) - L_k(l, m))$. Note that, in the third equation of the equations (17) of the reference document of the prior art corresponding to the first term of the above-mentioned equation (10), signs of polarity are inverted. However, since the second term of the equation (10) has as much weight as the first term thereof, the present inventor uses the above-mentioned equation (10) to make the model complete.

Even when the algorithm having the operating time complexity of the order $O(V^3)$ is used, the calculation is not practical for a large vocabulary of an order of $10^4$ or higher. Since there is required the operating time of the order $O(V)$ in any way in the step A1, it seems to us that the step A2 is the only part which can be modified. In the step A2, we allowed all the possible class pairs to be considered for merging process, however, we can practice restrict the domain of possible class pairs to investigate. With regard to this, in the first prior art, there is proposed the following method, which the present invention also adopted. We, first of all, make V singleton classes out of the words in the text data including V words that are not repetitive and arrange the classes in the descending order of frequency, then define the "merging region" (referred to as a window in the present preferred embodiment, and therefore, the merging region and the window are the synonyms in the present specification) as the first (c+1) class word in the sequence of classes. So initially the (c+1) most frequent words are in the merging region. Then the following processes are executed.

<Step D1> There is executed merging process of the pair of classes merging of which induces the minimum AMI reduction among all the pairs in the merging region.

<Step D2> The class in the (c+2)-th position is put into the merging region or the window, and each class after the (c+2)-th position is leftward shifted by one.

<Step D3> The steps D1 and D2 are repeated until predetermined c classes remain.

With this first prior art algorithm, the operating time complexity of the step A2 becomes the order of $O(c^2)$ proportional to $c^2$, i.e., the second power of the final number c of the classes, and the total operating time is reduced to the order of $(c^2V)$ proportional to $c^2V$.

A method for obtaining a word clustering structure will be described next.

The simplest way to obtain a tree representation of the word clustering structure is to construct a dendrogram (also called "a tree system diagram or tree diagram" hereinafter) as a byproduct of the merging process, that is, practically, to keep track of the order or history of merging and make a binary tree out of the record.

Figure 6:
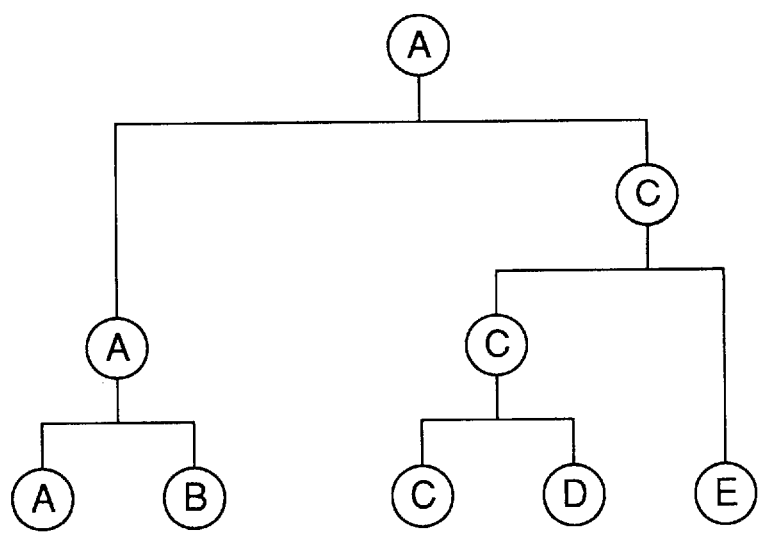
FIG. 6 is a diagram of an exemplified dendrogram of a branching tree diagram obtained by the word clustering process.

A simple example with a five word vocabulary is shown in FIG. 6. The merging history shown in FIG. 6 is as shown in the following Table 1. It is to be noted that the first entry of Table 1 means "that the class A and class B are merged with each other and the resulting new class after the merging process is named class A".

TABLE 1

| Merge History | |
| --- | --- |
| Merge | (A, B → A) |
| Merge | (C, D → C) |
| Merge | (C, E → C) |
| Merge | (A, C → A) |

Figure 7:
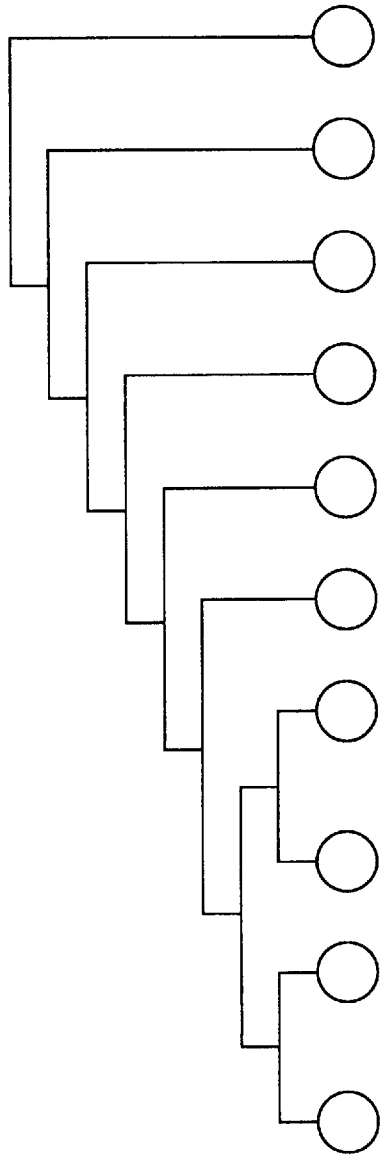
FIG. 7 is a diagram of an exemplified left branching tree obtained by the word clustering process.

However, when this method is directly applied to the above $O(C^2V)$ algorithm of the first prior art, we obtain for each class an extremely unbalanced, almost left branching subtree like the one illustrated in FIG. 7. The reason is that after a plurality of classes in the merging region are grown to a certain size, it is much less expensive, in terms of the AMI, to merge a singleton class with lower frequency into a higher frequency class than merging higher frequency classes with relatively large sizes.

A new approach that the present inventor adopted is as follows.

Figure 19:
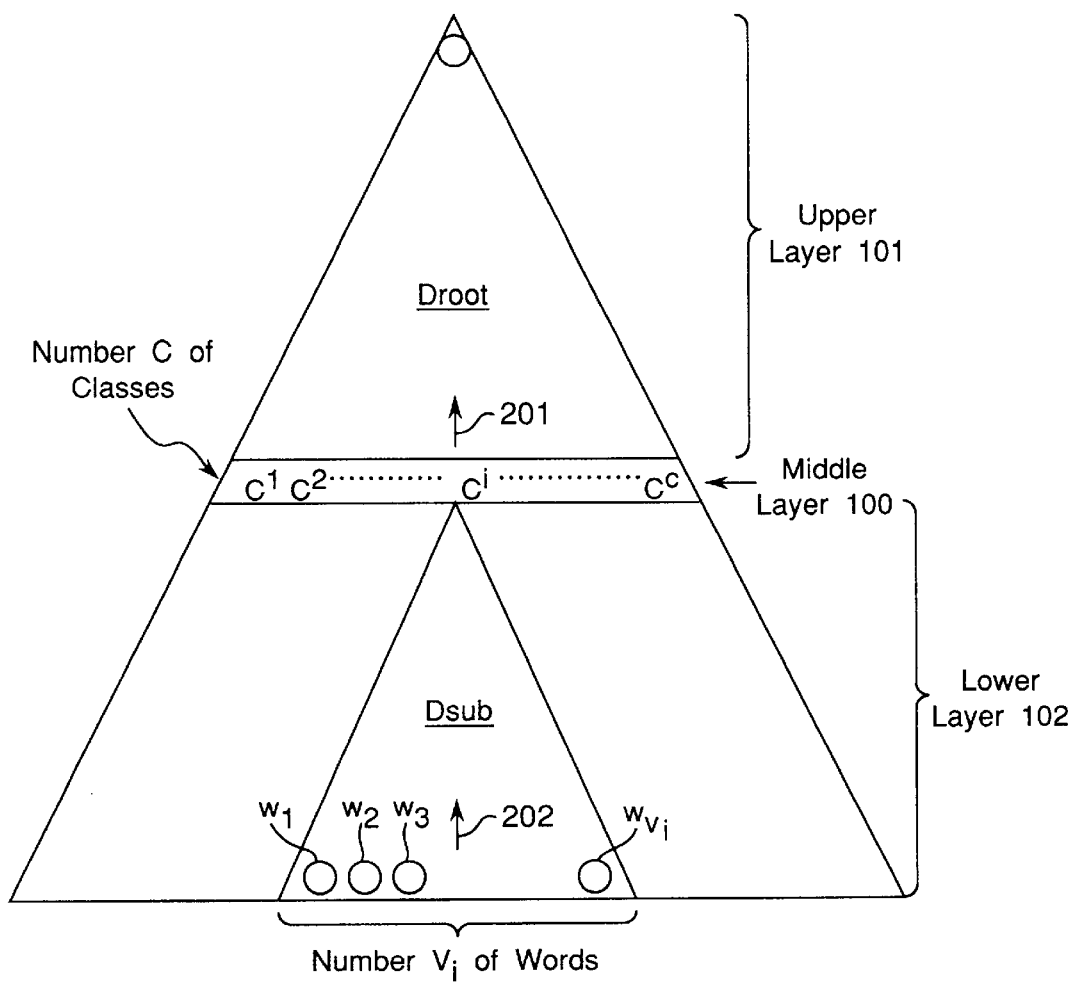
FIG. 19 is a schematic diagram of the word clustering process shown in FIG. 11 and a hierarchical structure obtained by the process.

<Step E1> MI-clustering: There are made c classes by using a mutual information (MI) clustering algorithm with the merging region constraint. The c classes constitute a middle layer 100 of the dendrogram of the final tree diagram as shown in FIG. 19, so MI-clustering can be considered a type of middle layer clustering.

<Step E2> Outer-clustering: All words in the text data are replaced with their class token (in the actual implementation, processing is effected only on the bigram table instead of the entire text data), and a merging process (binary merging) is executed in the binary tree form without the merging region constraint until all the classes are merged into a single class. A dendrogram $D_{root}$ is made out of this process. This dendrogram, $D_{root}$, constitutes an upper layer 101 of the final tree structure as shown in FIG. 19, so outer clustering can be considered a type of upper layer clustering.

<Step E3> Inner-clustering: Let $\{C^1, C^2, \ldots, C_i, \ldots, C_c\}$ be the set of the classes (class set) of the middle layer 100 obtained in step E1. For each i ( $1 \leq i \leq c$; i is a natural number), the following processing is executed.

<Step E3-1> All the words in the text data are replaced except those in $C_i$ with their class token. A new vocabulary $V'=V_1 \sqcup V_2$ is defined, where $V_1=\{$all the words in $C_i\}$, $V_2=\{C^1, C^2, \ldots, C^{i-1}, C^{i+1}, C^c\}$, and $C^j$ is a j-th class token ($1 \leq j \leq c$; $j \neq i$). Each element in the new vocabulary V' is assigned to its own class, and then the merging process is executed in a binary tree form with a merging constraint such that only those classes which only contain elements of $V_1$ can be merged. This process can be executed by ordering elements of V' including elements (i.e., words) of $V_1$ in the first $|V_1|$ classes and then executing the merging process within a merging region whose width is $|V_1|$ initially and decreases by one with each merging step. In the above discussion, $|V_1|$ is the number of words of the vocabulary $V_1$.

<Step E3-2> The merging process is repeated until all the elements in the vocabulary $V_1$ are put in a single class. A dendrogram $D_{sub}$ of a lower layer 102 is made out of the merging process for each class as shown in FIG. 19, so inner-clustering can be considered a type of lower layer clustering. This dendrogram constitutes a subtree for each class with a leaf node representing each word in the class.

<Step E4> The dendrograms are combined by substituting each leaf node of the dendrogram $D_{root}$ of the upper layer 101 with the corresponding dendrogram $D_{sub}$ of the lower layer 102, thereby obtaining the total dendrogram.

The word clustering method of the present invention produces a tree structure having a balanced binary tree representation wherein those words which are close in meaning or syntactic feature are close in position.

Figure 8:
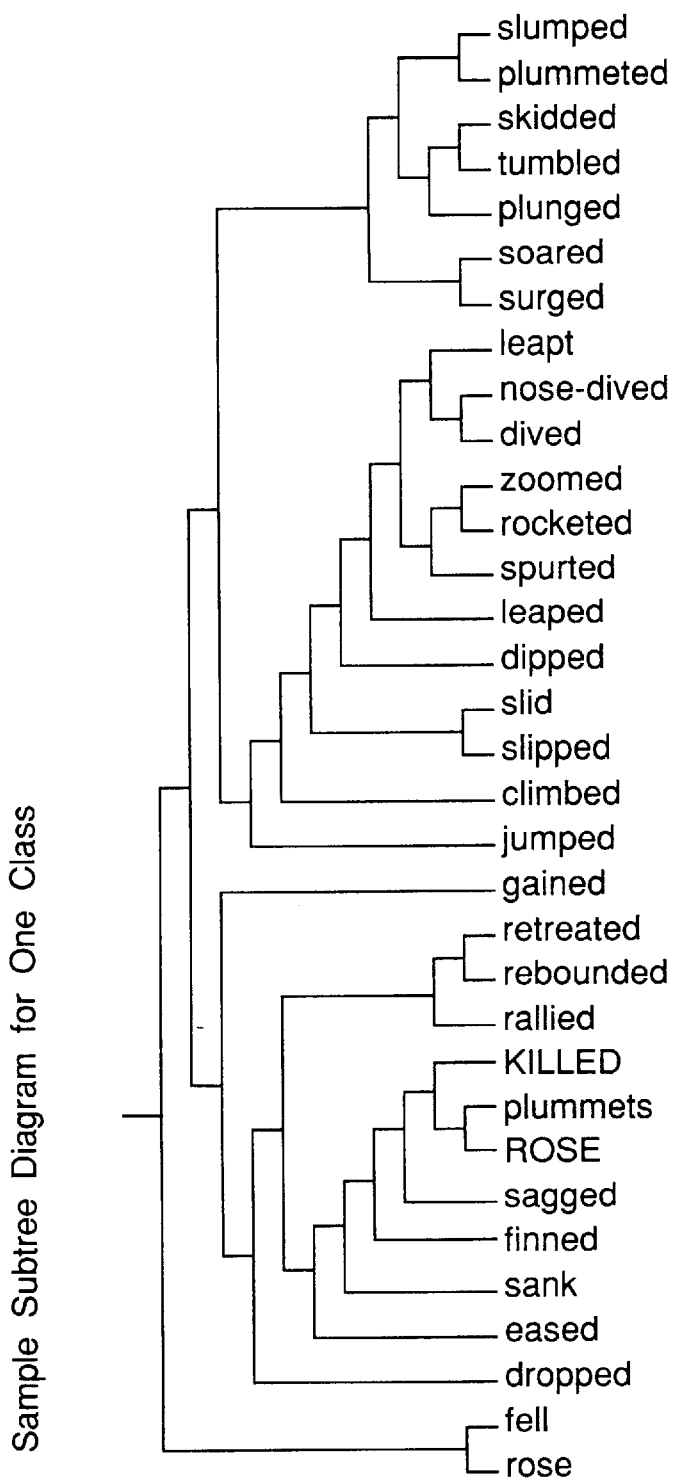
FIG. 8 is a diagram of a sample subtree for one class obtained by the word clustering process.

FIG. 8 shows an exemplified dendrogram $D_{sub}$ of the lower layer for one class out of 500 classes constructed using the method according to the present invention with a vocabulary of top 70,000 most frequently occurring words in the Wall Street Journal (referred to as a WSJ hereinafter) Corpus. Finally, by tracing the path from the root node to each leaf node and assigning one bit to each branch with zero or one representing a left or right branch, respectively, a sequence of bits or word bits can be assigned to each word in the vocabulary.

Figure 10:
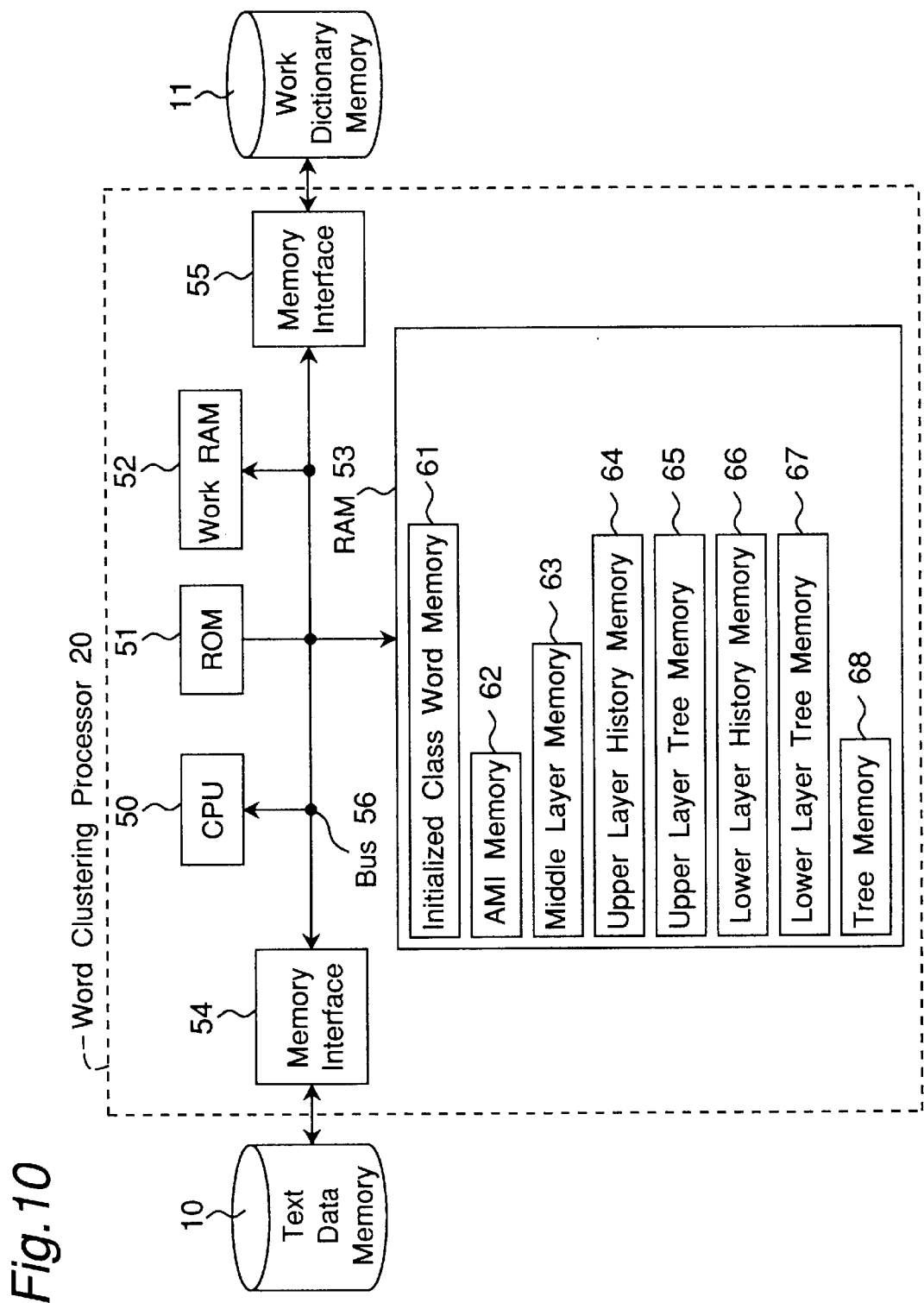
FIG. 10 is a block diagram showing a construction of a word clustering processor 20 shown in FIG. 1.

FIG. 10 is a block diagram showing a construction of the word clustering processor 20 shown in FIG. 1. The construction and operation of the word clustering processor 20 will be described with reference to FIG. 10.

Referring to FIG. 10, the word clustering processor 20 is a controller provided with a CPU 50, and the word clustering processor 20 comprises:

(a) the CPU 50 which controls the operation of the word clustering processor 20;

(b) a ROM 51 which stores a control program of the word clustering process to be executed by the CPU 50 and data necessary for executing the control program;

(c) a work RAM 52 which is a work area necessary when executing the word clustering process;

(d) a RAM 53 which has a plurality of memory areas necessary when executing the word clustering process; and (e) two memory interfaces 54 and 55 which are respectively connected with the text data memory 10 and the word dictionary memory 11, wherein these circuits 50 to 55 are connected with each other through a bus 56.

In the present case, the memory interface 54 is an interface circuit that is provided between the text data memory 10 and the CPU 50 and executes an interface process such as signal conversion between the text data memory 10 and the CPU 50. On the other hand, the memory interface 55 is an interface circuit that is provided between the word dictionary memory 11 and the CPU 50, and executes an interface process such as signal conversion between the word dictionary memory 11 and the CPU 50. The RAM 53 is provided with a plurality of memory sections divided or segmented into the following memories 61 to 68:

(a) an initialized class word memory 61 which stores v words and their classes obtained by an initialization process described later;

(b) an AMI memory 62 which makes temporary pairs of all combinations of words of classes within one window in a middle layer clustering process, an upper layer clustering process and a lower layer clustering process, wherein those processes will be described in detail later, and which stores the result of calculation of an average mutual information when each pair are subjected to the merging process according to the equation (2);

(c) a middle layer memory 63 which stores c class words of the middle layer obtained by the middle layer clustering process described later;

(d) an upper layer history memory 64 which stores the history of the respective merging processes of the upper layer clustering process described later;

(e) an upper layer tree memory 65 which stores the dendrogram $D_{root}$ that is the tree diagram obtained by the upper layer clustering process;

(f) a lower layer history memory 66 which stores a plurality of "c" dendrograms $D_{sub}$ that is the tree diagram for each class of the middle layer 100 obtained by the lower layer clustering process;

(g) a lower layer tree memory 67 which stores the dendrogram $D_{sub}$ that is the tree diagram obtained by the lower layer clustering process; and (h) a tree memory 68 which stores a dendrogram that is the total tree diagram obtained by connecting one dendrogram of the upper layer 101 with the plurality of "c" dendrograms of the lower layer 102 through the middle layer 100.

Figure 11:
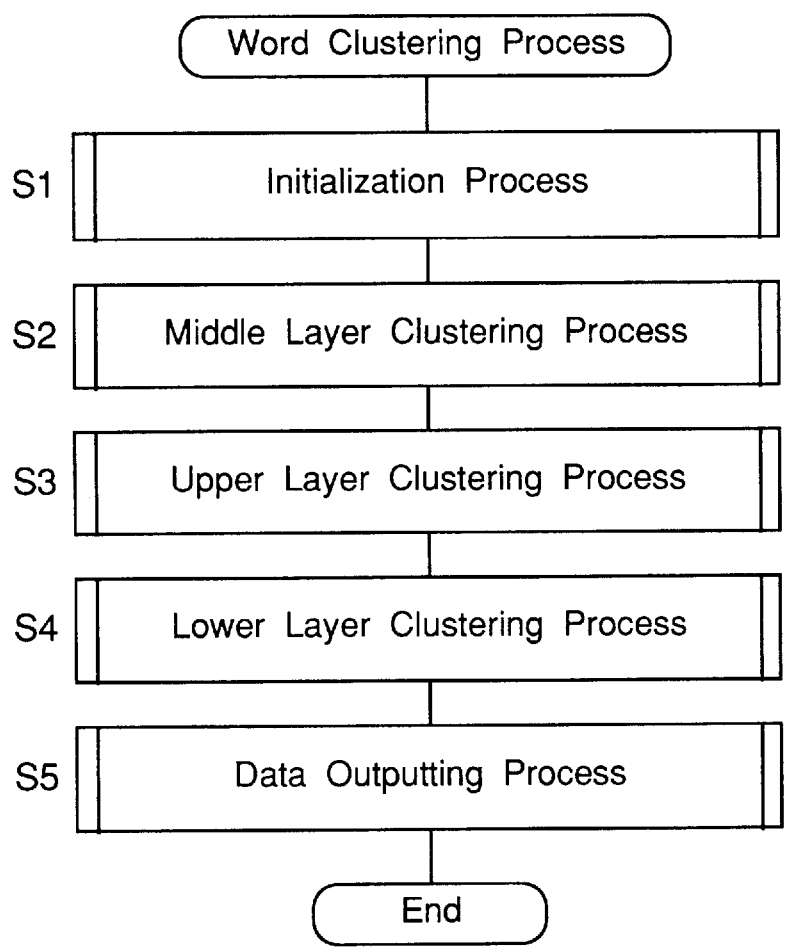
FIG. 11 is a flowchart of a word clustering process of a main routine executed by the word clustering processor 20 shown in FIG. 1.

FIG. 11 is a flowchart of a word clustering process of a main routine to be executed by the word clustering processor 20 shown in FIG. 1.

Referring to FIG. 11, first of all, in step S1, there is executed an initialization process for arranging the words in a descending order of appearance frequency based on the text data stored in the text data memory 10. Then, in step S2, there is executed the middle layer clustering process for obtaining class words of the middle is layer 100. Further, in step S3, there is executed the upper layer clustering process for obtaining the tree diagram of the upper layer 101. Then, in step S4, there is executed the lower layer clustering process for obtaining the tree diagram of the lower layer 102. Finally, in step S5, there is executed a data outputting process for obtaining a dendrogram that is the total tree diagram by connecting one tree diagram of the upper layer 101 with the plurality of "c" tree diagrams of the lower layer 102 through the middle layer 100, and storing the resulting dendrogram as a word dictionary into the word dictionary memory 11. Then, the word clustering process is completed. In these tree diagrams, the respective words is classified into the respective classes, respectively, and an inter-class linkage relationship is shown.

Figure 12:
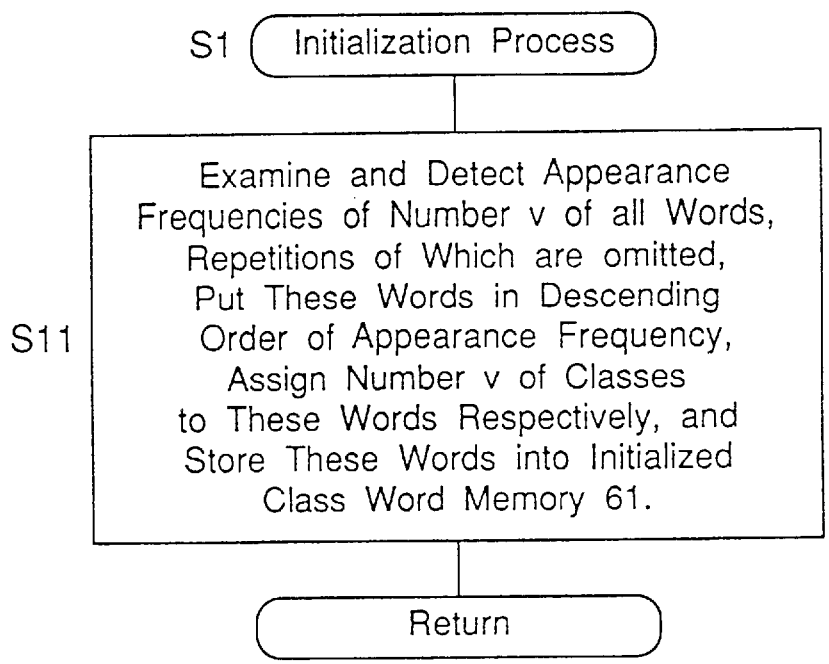
FIG. 12 is a flowchart of an initialization process (S1) of a subroutine of FIG. 11.

FIG. 12 is a flowchart of an initialization process (S1) of a subroutine of FIG. 11.

Referring to FIG. 12, in step S11, appearance frequencies of a plurality of "v" words, repetitions of which are omitted, are examined, searched or detected based on the text data in the text data memory 10, and these words are arranged in a descending order of appearance frequency and assigned to a plurality of "v" classes. The words of the plurality of "v" classes are stored in the initialized class word memory 61, and the program flow returns to the main routine. In the present case, v is a natural number that is equal to or larger than two.

Figure 13:
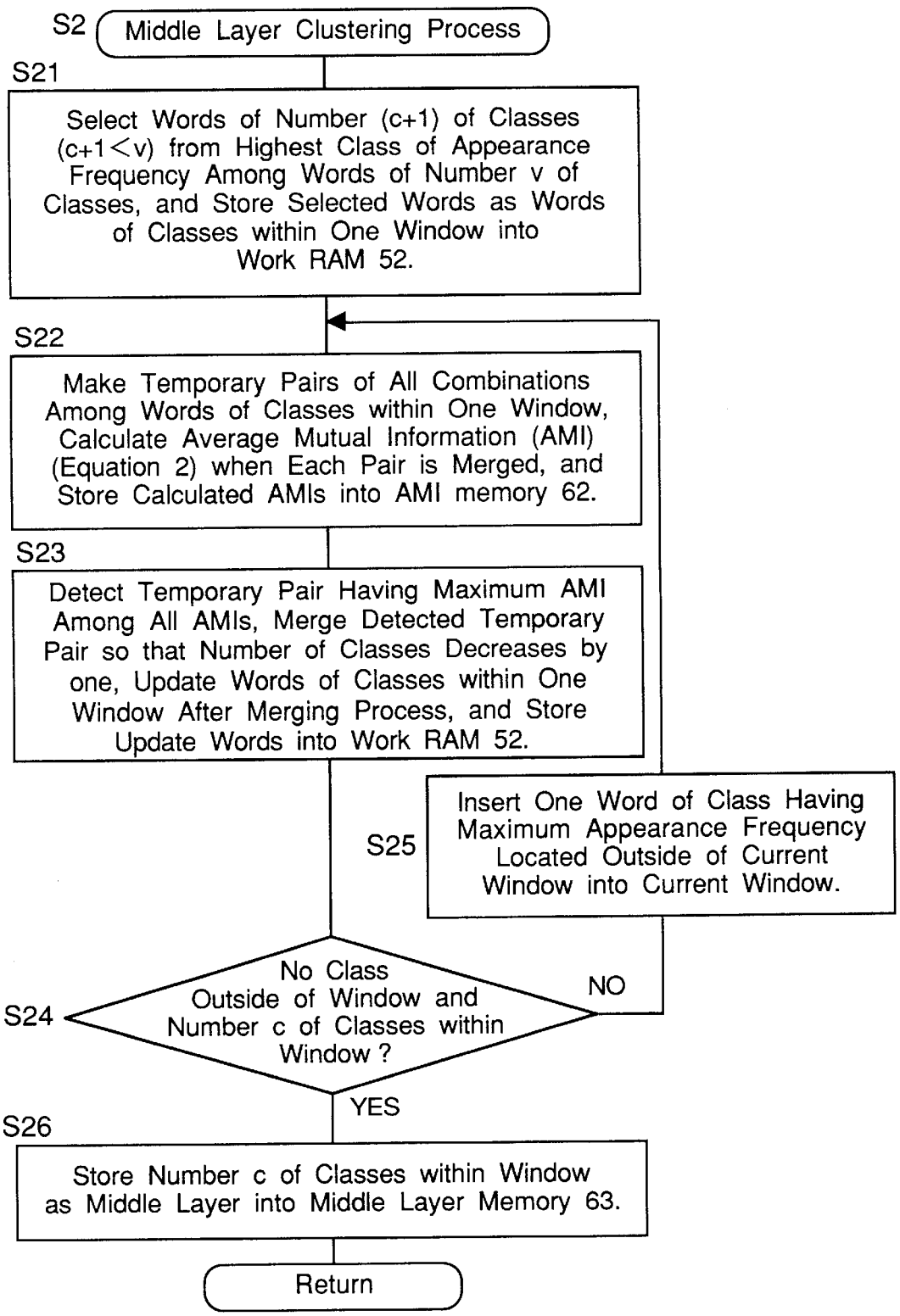
FIG. 13 is a flowchart of a middle layer clustering process (S2) of a subroutine of FIG. 11.

FIG. 13 is a flowchart of a middle layer clustering process (S2) of a subroutine of FIG. 11.

Figure 17:
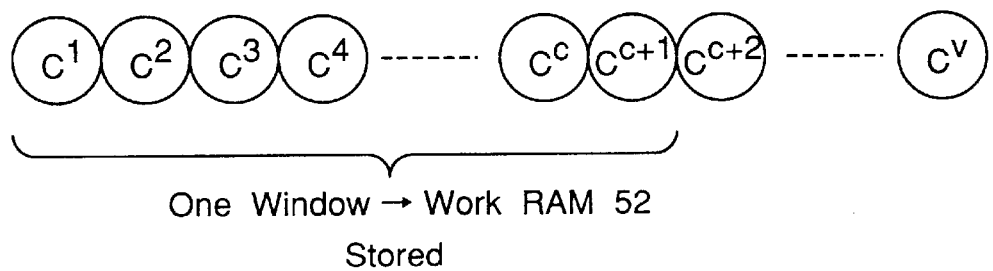
FIG. 17 is a schematic diagram showing a set of word classes in step S21 of the middle layer clustering process (S2) of the subroutine of FIG. 11.

Referring to FIG. 13, first of all, in step S21, the words of the plurality of "v" classes are read our from the initialized class word memory 61, and among the words of the plurality of "v" classes, words of (c+1) classes (c+1<v) are stored as words of classes within one window or merging region into the work RAM 52 in a descending order of appearance frequency of the classes as shown in FIG. 17. In the present case, 1<c+1<v. Then, in step S22, among the words within one window stored in the work RAM 52, temporary pairs of two words of all combinations are made, and an average mutual information when each temporary pair is subjected to the merging process are calculated according to the equation (2), and the temporary pairs and the calculated average mutual information corresponding thereto are stored into the AMI memory 62 in a form of the following Table 2.

TABLE 2

| Temporary Pair | Average Mutual Information |
| --- | --- |
| $(C^1, C^2)$ | 0.867678 |
| $(C^2, C^3)$ | 0.234689 |
| $(C^3, C^4)$ | 0.125686 |
| - - - - - | - - - - - |
| $(C^c, C^{c+1})$ | 0.675642 |

Figure 18:
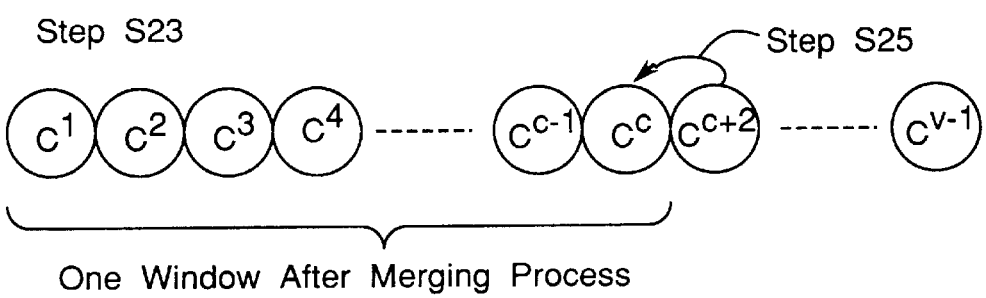
FIG. 18 is a schematic diagram showing a set of word classes in steps S23 and S24 of the middle layer clustering process (S2) of the subroutine of FIG. 11.

Then, in step S23, as shown in FIG. 18, among the average mutual information of the temporary pairs stored in the AMI memory 62, the temporary pair whose average mutual information is maximized is found out and subjected to the merging process, thereby causing clearance of one class. Thus, the words of the classes within one window are updated after the merging process, and the updated class words are stored into the work RAM 52. Then, in step S24, it is decided whether or not there is no class outside the window and there is c classes within the window remain. When the answer is negative or NO by decision, in step S25, the words of a class that is located outside the current window and have the maximum appearance frequency is inserted into the window as shown in FIG. 18, thereby updating the words of the classes within one window after the insertion. After storing the words of the updated classes into the work RAM 52, the program flow returns to step S22, and then, it is repeated to perform the processes of the step S22 and subsequent steps.

Otherwise, when the answer is affirmative or YES in step S24, the c classes and the words belonging thereto within the window, which have been stored in the work RAM 52, are stored as the middle layer 100 into the middle layer memory 63 in step S26. By this operation, the middle layer clustering process is completed, and the program flow returns to the main routine.

Figure 14:
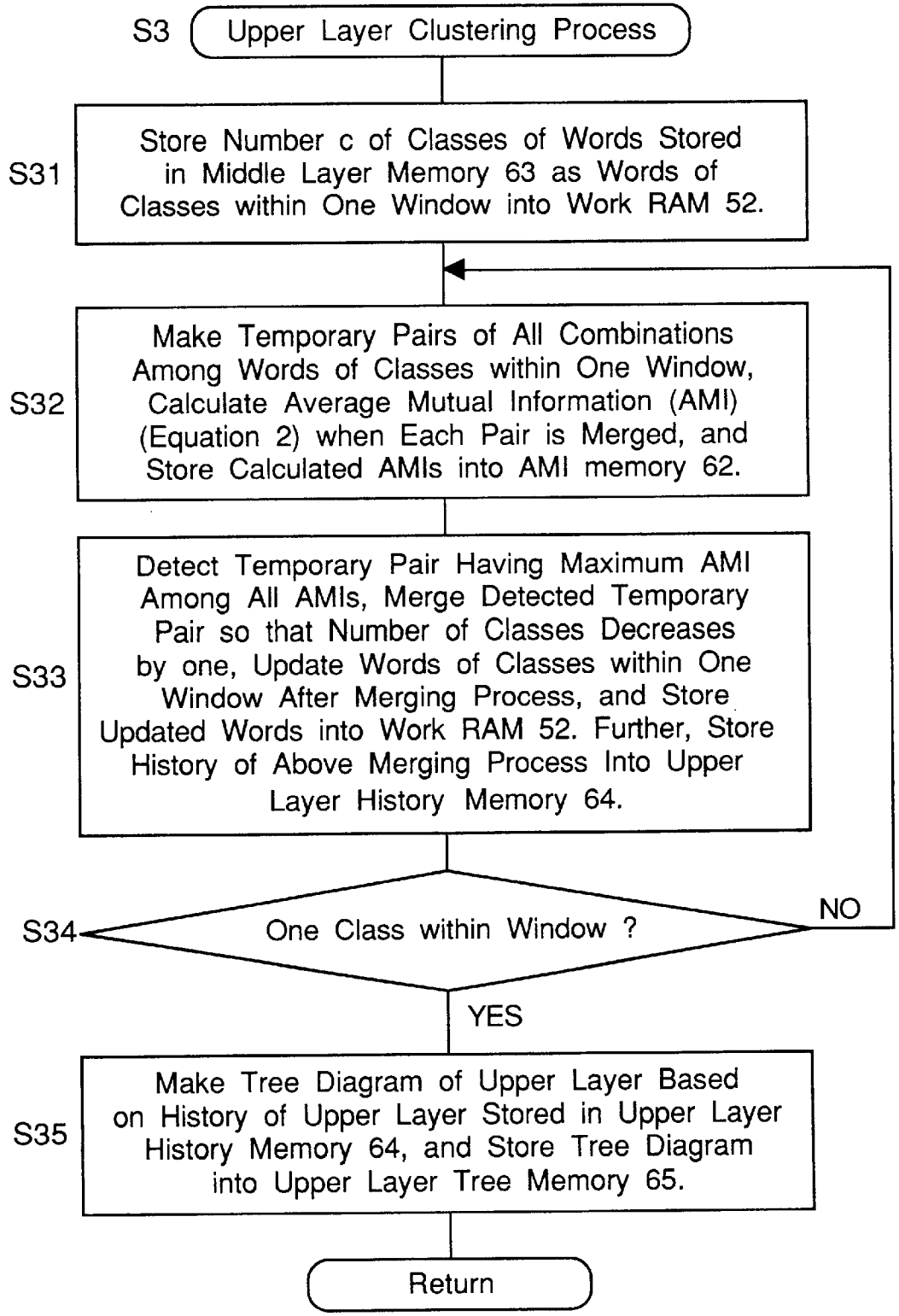
FIG. 14 is a flowchart of an upper layer clustering process (S3) of a subroutine of FIG. 11.

FIG. 14 is a flowchart of an upper layer clustering process (S3) of a subroutine of FIG. 11. As shown in FIG. 19, the present process is to obtain a tree diagram extending from the middle layer 100 in the direction of an arrow 201.

Referring to FIG. 14, first of all, in step S31, the words of c classes stored in the middle layer memory 63 are read out, and thereafter, the words of the c classes are stored as class words within one window into the work RAM 52. Then, in step S32, in a manner similar to that of step S22, temporary pairs of two words of all combination are made among the class words in the one window stored in the work RAM 52, and an average mutual information when each temporary pair are subjected to the merging process are calculated according to the equation (2), and the temporary pairs and the calculated average mutual information corresponding thereto are stored into the AMI memory 62 in a form of the above-mentioned Table 2.

Then, in step S33, in a manner similar to that of step S23, among the average mutual information of the temporary pairs stored in the AMI memory 62, the temporary pair whose average mutual information is maximized is found out and subjected to the merging process, thereby causing clearance of one class. Thus, the words of the classes within one window are updated after the merging process, and the updated class words are stored into the work RAM 52. Further, a history which has, for example, a form of Table 1 and is indicative of the fact that which class and which class have been merged into a newly named class is stored in the upper layer history memory 64. Then, in step S34, it is decided whether or not the number of classes in the window has become one. When the answer is NO by decision, the program flow returns to step S32 to repeat the processes of the step S32 and the subsequent steps.

Otherwise, when the answer is YES in step S34, for example, an upper layer tree diagram or a dendrogram $D_{root}$ is made based on the upper layer history stored in the upper layer history memory 64 as shown in FIG. 6, and it is stored into the upper layer tree memory 65 in step S35. By this operation, the upper layer clustering process is completed, and the program flow returns to the main routine.

Figure 15:
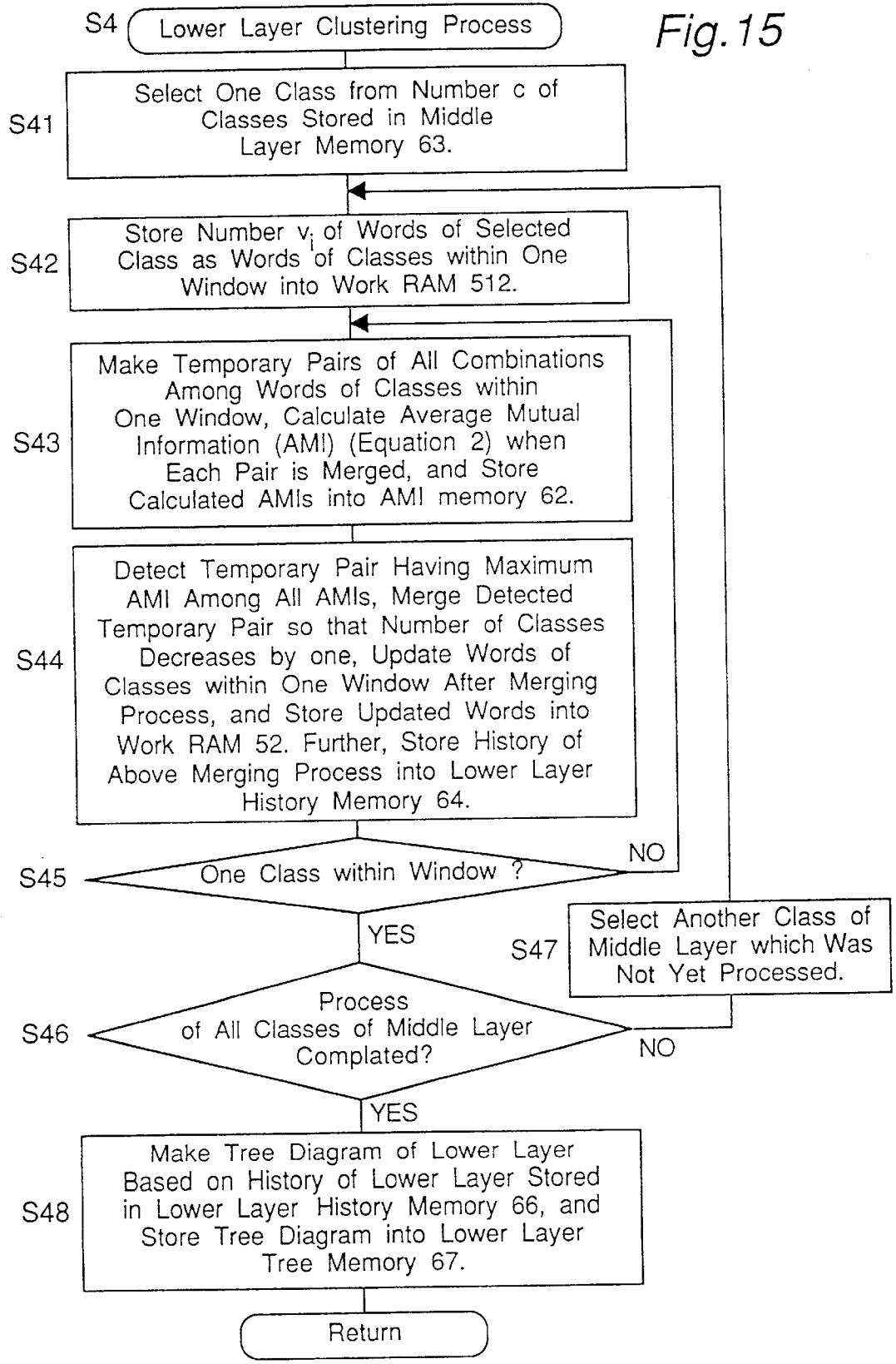
FIG. 15 is a flowchart of a lower layer clustering process (S4) of a subroutine of FIG. 11.

FIG. 15 is a flowchart of a lower layer clustering process (S4) of a subroutine of FIG. 11. As shown in FIG. 15, the present process is to obtain a tree diagram in the direction of an arrow 202 every class $C^i$ of the middle layer 100 from the word located in the bottom position of the lower layer 102.

Referring to FIG. 15, first of all, in step S41, the words of c classes in the middle layer memory 63 are read out, and thereafter one class is selected from the c classes. Then, in step S42, $v_i$ words in the selected class are stored as class words within one window into the work RAM 52. Then, in step S43, in a manner similar to that of steps S22 and S32, temporary pairs of two words of all combination are made among the class words in the one window stored in the work RAM 52, and an average mutual information when each temporary pair are subjected to the merging process are calculated according to the equation (2), and the temporary pairs and the calculated average mutual information corresponding thereto are stored into the AMI memory 62 in the form of the above-mentioned Table 2.

Then, in step S44, in a manner similar to those of steps S23 and S33, among the average mutual information of the temporary pairs stored in the AMI memory 62, the temporary pair whose average mutual information is maximized is found out, and subjected to the merging process, thereby causing clearance of one class. Thus, the words of the classes within one window are updated after the merging process, and the updated class words are stored into the work RAM 52. Further, a history which has, for example, a form of Table 1 and is indicative of the fact that which class and which class have been merged into a newly named class is stored in the lower layer history memory 66. Then, in step S45, it is decided whether or not the number of classes in the window has become one. When the answer is NO by decision, the program flow returns to step S43 to repeat the processes of the step S43 and the subsequent steps. In the present case, the processes of steps S43 and S44 are executed for every class of the middle layer 100.

Otherwise, when the answer is YES in step S45, it is decided in step S46 whether or not all the classes of the middle layer 100 have been processed. When the answer is NO by decision, this means that an unprocessed class remains, and the remaining unprocessed class of the middle layer 100 is selected in step S47, and thereafter, the program flow proceeds to step S42. Otherwise, when the answer is YES by decision in step S46, for example, a lower layer tree diagram or a dendrogram $D_{sub}$ is formed based on the lower layer history stored in the lower layer history memory 66 as shown in FIG. 6, and is stored into the lower layer tree memory 67 in step S48. By this operation, the lower layer clustering process is completed, and the program flow returns to the main routine.

Figure 16:
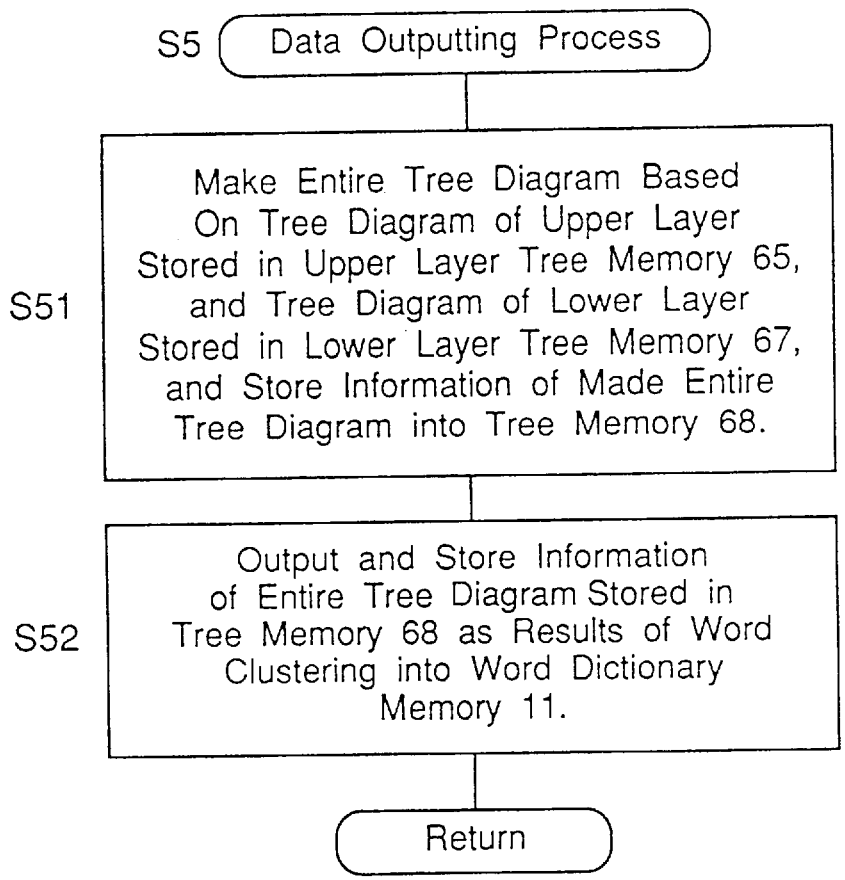
FIG. 16 is a flowchart of a data outputting process (S5) of a subroutine of FIG. 11.

FIG. 16 is a flowchart of a data outputting process (S5) of a subroutine of FIG. 11.

Referring to FIG. 16, first of all, in step S51, based on the upper layer tree diagram in the upper layer tree memory 65 and the lower layer tree diagram in the lower layer tree memory 67 as shown in FIG. 19, these two tree diagrams are connected with each other through each class $C^i$ of the middle layer 100. That is, the upper layer tree diagram in the upper layer tree memory 65 is connected to each class $C^i$ of the middle layer 100, and the lower layer tree diagrams in the lower layer tree memory 67 are connected to each class $C^i$ of the middle layer 100 so that the class located at the top of each lower layer tree diagram is connected to each class $C^i$. By this operation, the total tree diagram based on the text data is made, and the information of the tree diagram is stored into the tree memory 68. In the tree memory 68, an inter-class word linkage relationship is stored as a word dictionary as shown in FIGS. 6 and 8. Then, in step S52, the information of the tree diagram in the tree memory 68 is outputted as a word clustering result to be stored in the word dictionary is memory 11.

First preferred embodiment

FIG. 1 is a block diagram of a speech recognition apparatus according to the first preferred embodiment of the present invention.

Referring to FIG. 1, by executing the above-mentioned word clustering process by the word clustering processor 20, text data which includes, for example, a plurality of English or Japanese words which are stored in the text data memory 10 are clustered into a plurality of classes and are stored as a word dictionary with the statement of the inter-class linkage relationship into the word dictionary memory 11.

On the other hand, an utterance speech composed of a plurality of words inputted to a microphone 1 is converted into a speech electric signal by the microphone 1, and thereafter, the converted speech electric signal is subjected to an analog to digital conversion by an A/D converter 2 so that the speech electric signal is converted into a digital speech signal. The digital speech signal is inputted to a feature extracting section 3. The feature extracting section 3 subjects the inputted digital speech signal to, for example, an LPC analysis so as to extract acoustic feature parameters such as a cepstrum coefficient and logarithmic power, and outputs the parameters to a speech recognition section 5 through a buffer memory 4. With reference to the word dictionary stored in the word dictionary memory 11 as well as, for example, a language model such as a phonemic Hidden Markov Model (referred to as a phonemic HMM hereinafter) stored in a language model memory 12, the speech recognition section 5 executes a speech recognition process every word, and then, outputs the result of speech recognition. It is to be herein noted that the word dictionary stored in the word dictionary memory 11 includes such information as a sequence of bits for expressing each word and the class belonging thereto as follows:

(a) 010010010, position;

(b) 010010011, location; and (c) 110010100, for.

Second preferred embodiment

Figure 2:
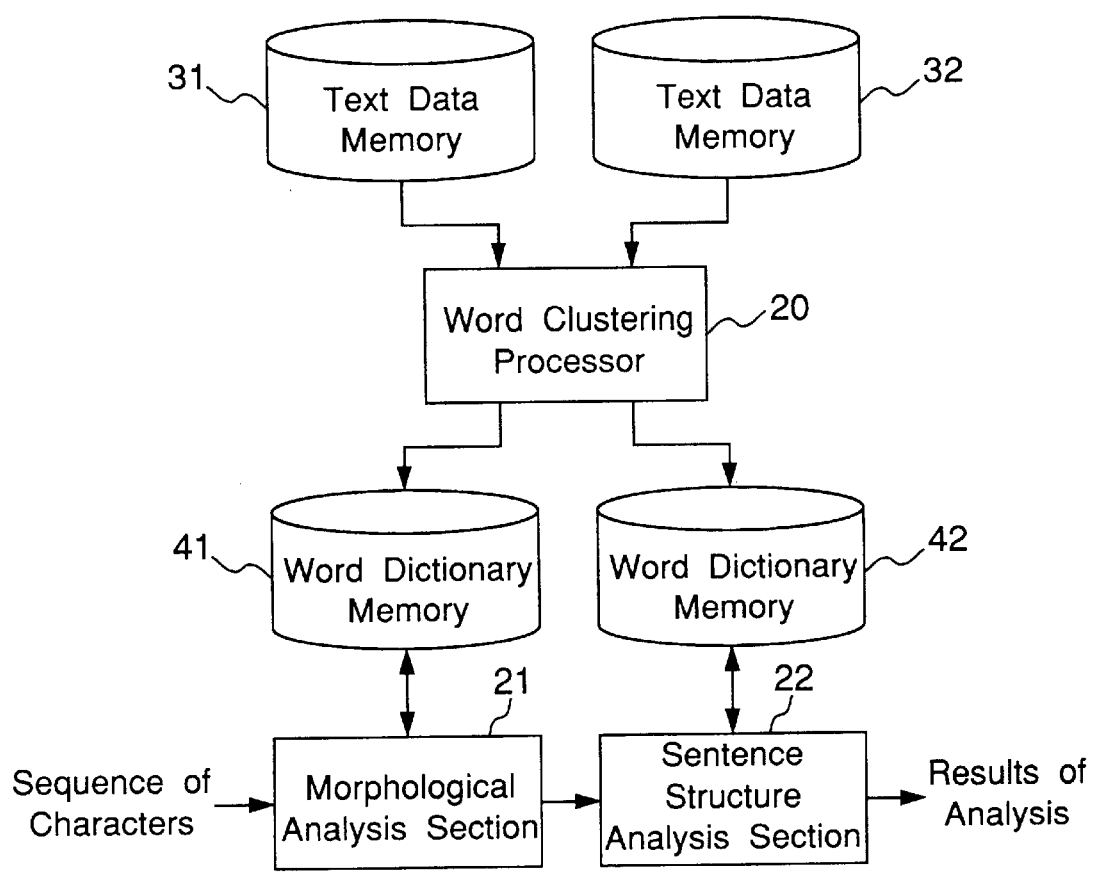
FIG. 2 is a block diagram of a morphological analysis and sentence structure analysis apparatus according to a second preferred embodiment of the present invention.

FIG. 2 is a block diagram of a morphological analysis and sentence structure analysis apparatus according to the second preferred embodiment of the present invention.

Referring to FIG. 2, by executing the above-mentioned word clustering process by the word clustering processor 20, two text data composed of a plurality of words stored respectively into text data memories 31 and 32 are clustered into a plurality of classes and are stored as word dictionaries with the statement of the inter-class linkage relationship into word dictionary memories 41 and 42, respectively.

A natural language sentence which is composed of a sequence of characters of a predetermined language of Japanese, English or the like and which is composed of a plurality of words is inputted to a morphological analysis section 21. With reference to the word dictionary stored in the word dictionary memory 41 for an appearance form of respective words of the inputted natural language sentence, the morphological analysis section 21 divides or segments the natural language sentence into a plurality of words, attaches information data such as a part of speech, a conjugation, a standard expression, and a synonym code to the appearance form, and outputs these analysis results to a sentence structure analysis section 22. Thereafter, with reference to the word dictionary stored in the word dictionary memory 42, the sentence structure analysis section 22 executes a predetermined sentence structure analysis process so as to attach sentence structure tree information to the sequence of words, and then, outputs the resultant as an analysis result.

As described above, a plurality of words are clustered into a plurality of classes in the binary tree form with a hierarchical structure including the lower layer, the middle layer and the upper layer as shown in FIG. 19. Therefore, a word clustering result having a balanced hierarchical structure can be obtained by the word clustering process. Furthermore, in the AMI calculation, an AMI is calculated for the words of all the classes in each of the lower layer, the middle layer and the upper layer. Therefore, the calculated AMI is not a local AMI, and the clustering process is executed based on the global AMI including the entire word information. Therefore, the totally optimized word clustering results can be obtained. With this arrangement, a more precise and accurate clustering system can be obtained when automatically obtaining the clustering system of words from the text data. Furthermore, by executing the speech recognition process based on the word dictionary obtained by the word clustering processor 20, speech recognition having a higher rate of recognition than that of the prior art can be achieved.

In the above-mentioned preferred embodiment, the speech recognition section 5, the word clustering processor 20, the morphological analysis section 21, and the sentence structure analysis section 22 are implemented by, for example, a digital computer or controller.

The word clustering process of the above-mentioned preferred embodiment is executed in the order of the middle layer clustering process, the upper layer clustering process and the lower layer clustering process as shown in FIG. 11. However, the present invention is not limited to this, and the processes may be executed in an order of the middle layer clustering process, the lower layer clustering process and the upper layer clustering process.

In the above preferred embodiment, it is acceptable to execute the process of clustering a plurality of words into a plurality of classes by utilizing the word n-gram on the criterion that words having a high rate of their being located adjacent to an identical word are assigned to an identical class before the initialization process shown in FIG. 11.

In the above-mentioned preferred embodiments, the RAM 53 includes the memories 61 to 68, however, the present invention is not limited to this. The memories 61 to 68 may be provided to be separated from each other.

Experiment of Simulation

We used plain text data from six years of the WSJ Corpus to create clusters and word bits. The sizes of the text data are 5 million words, 10 million words, 20 million words, and 50 million words (i.e., 5 MW, 10 MW, 20 MW, and 50 MW, respectively, where W means word). The vocabulary is selected as top 70,000 most frequently occurring words in the entire corpus. We set the number of c final classes as 500. The obtained clusters and word bits are evaluated by the following measure SS1: the measure SS1 is a perplexity measure for calculating the perplexity of class-based trigram models based on WSJ Corpus and a General English Treebank of a corpus owned by the present applicant.

Perplexity Measurements

Using a class function G which maps a word to its class, the word trigram probability can be rewritten as follows.

$$P(w_i|w_{i-2}w_{i-1}) = P_c(G(w_i))|G(w_{i-2})\ G(w_{i-1}))P_m(w_i|G(w_i)) \quad (15)$$

where $P_c$ is a second order Markov chain probability and $P_m$ is a word membership probability. Smoothing of $P_c$ and $P_m$ are done using Katz's backoff and Good-Turing formula, respectively. The training text size is 1.9 MW and the test text size is 150 KW, both obtained from the WSJ Corpus. The vocabulary size is 77 KW.

Figure 9:
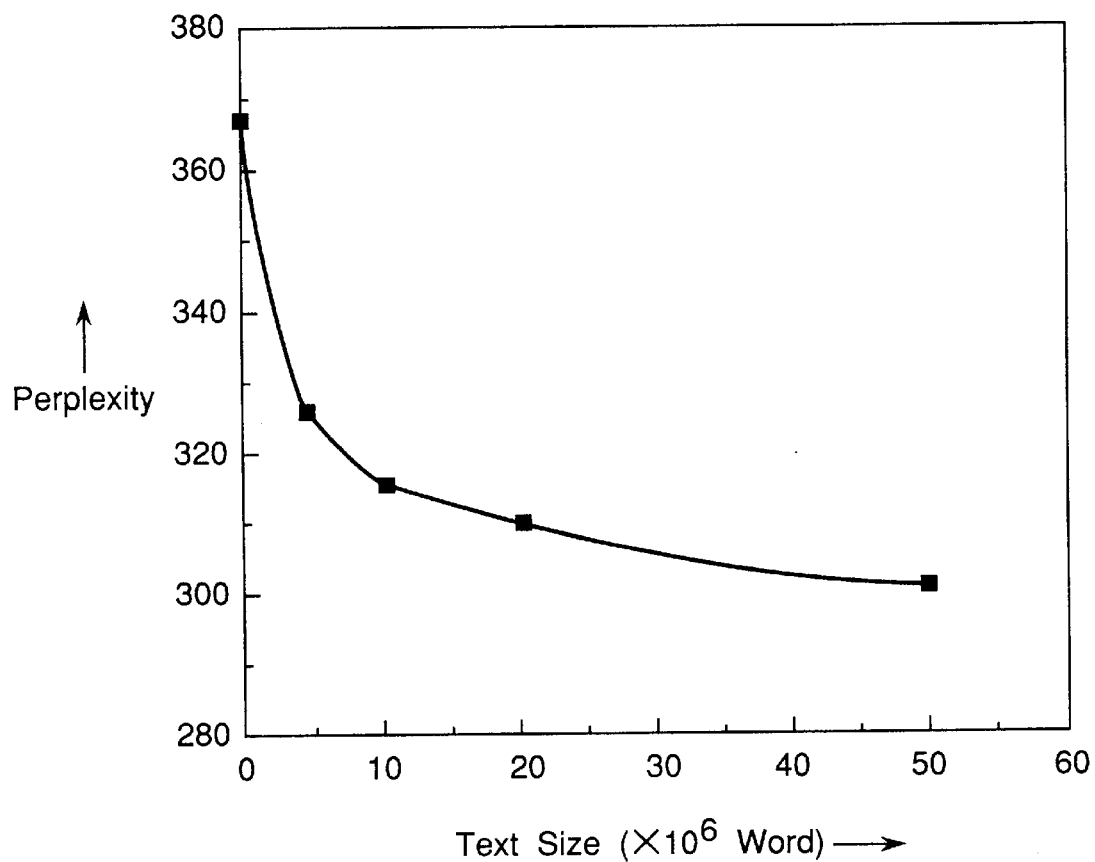
FIG. 9 is a graph showing a perplexity relative to text size obtained as a simulation result of speech recognition of the present invention.

FIG. 9 shows a perplexity of the test text versus the clustering text sizes. A point at zero clustering text size represents the perplexity with word trigram model. As the clustering text size increases, perplexity decreases monotonically, and this indicates the improvement of clustering process. At a text size of 50 MW, the perplexity is 18% which is lower than the perplexity with word trigram model. This result contrasts favorably with the result of the first prior art in which the class trigram perplexity is slightly higher than the perplexity with word trigram model.

According to the word clustering apparatus of the present preferred embodiments of the present invention, a plurality of words are clustered into a plurality of classes in the binary tree form with the hierarchical structure of the lower layer, the middle layer and the upper layer. Therefore, a word clustering result having a balanced hierarchical structure can be obtained by the word clustering process of the present invention. Furthermore, in calculation of the average mutual information, an AMI is calculated for the words of all the classes in each of the lower layer, the middle layer and the upper layer. Therefore, the calculated AMI is not a local average mutual information, and the clustering process is executed based on the global AMI including the entire word information. Therefore, a totally optimized word clustering result can be obtained. With this arrangement, a more precise and accurate clustering system can be obtained when automatically obtaining the clustering system of words from text data.

Further, according to the preferred embodiments of the present invention, when a class exists outside the one window stored in first storage means or when the number of classes existing within the one window is not c, words of a class which exists outside the current window and has a maximum appearance frequency are inserted into said window, and thereafter the word clustering process in the above-mentioned binary tree form is executed. Therefore, a middle layer having the predetermined plural number of c classes can be obtained in the optimized form.

According to the speech recognition apparatus comprising the word clustering processor, by executing the speech recognition process based on the word dictionary obtained by the word clustering processor, the word dictionary having a balanced hierarchical structure and being totally optimized, speech recognition having a higher rate of recognition than that of the prior art can be obtained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A word clustering apparatus for clustering a plurality of words and obtaining a total tree diagram representing a word clustering result, said total tree diagram including tree diagrams of an upper layer, a middle layer and a lower layer, said word clustering apparatus comprising:

first storage means for storing class words within one window;

second storage means for storing a plurality of c classes of the middle layer;

third storage means for storing the tree diagram of the upper layer;

fourth storage means for storing the tree diagram of the lower layer;

fifth storage means for storing the total tree diagram;

first control means for detecting an appearance frequency of a plurality of v words which are different from one another in text data including a plurality of words, for arranging the v words in a descending order of appearance frequency, and for assigning the v words to a plurality of v classes;

second control means for storing as class words within one window into said first storage means, words of (c+1) classes having a high appearance frequency, the number (c+1) smaller than v, among the v words of the plurality of v classes assigned by said first control means;

third control means, in response to the class words within one window stored in said first storage means, for clustering the class words within one window into a plurality of c classes in a predetermined binary tree form, so that a predetermined average mutual information is maximized, the average mutual information representing a relative frequency rate of a probability when words of a first class and words of a second class which are different from each other appear adjacent to each other, with respect to a product of the appearance frequency of the words of the first class and the appearance frequency of the words of the second class, and for storing the plurality of clustered c classes as a plurality of c classes of the middle layer, into said second storage means;

fourth control means, in response to the plurality of c classes of the middle layer stored in said second storage means, for clustering the words of the plurality of clustered c classes of the middle layer in a binary tree form until the words of the middle layer are clustered into one class so that the average mutual information is maximized, and for storing a result of the clustering as the tree diagram of the upper layer into said third storage means;

fifth control means, in response to the plurality of words in each of the plurality of c classes of the middle layer stored in said second storage means, for clustering the plurality of words of each class of the middle layer into a binary tree form until the words of each class of the middle layer are clustered into one class, for every class of the plurality of c classes of the middle layer stored in said second storage means so that the average mutual information is maximized, and for storing a result of the clustering for each class as the tree diagram of the lower layer into said fourth storage means; and sixth control means for obtaining the total tree diagram including the tree diagrams of the upper layer, the middle layer and the lower layer by connecting the tree diagram of the lower layer stored in said fourth storage means to the plurality of c classes of the middle layer stored in said second storage means, and connecting the tree diagram of the upper layer stored in said third storage means to the plurality of c classes of the middle layer stored in said second storage means, and for storing a resulting total tree diagram as a word clustering result into said fifth storage means.

2. The word clustering apparatus as claimed in claim 1, wherein, when a class exists outside the one window stored in said first storage means or when the number of classes existing within the one window is not c, said third control means inserts words of a class which exists outside the current window and has a maximum appearance frequency into said window, and thereafter clusters the class words within one window into a plurality of c classes in the binary tree form.

3. A speech recognition apparatus comprising:

word clustering means for clustering a plurality of words and obtaining a total tree diagram of a word dictionary representing a word clustering result, said total tree diagram including tree diagrams of an upper layer, a middle layer and a lower layer;

microphone means for converting an input utterance speech composed of a plurality of words into a speech signal;

feature extracting means for extracting predetermined acoustic feature parameters from the speech signal converted by said microphone means; and speech recognition means for executing a speech recognition process on the acoustic feature parameters extracted by said feature extracting means, with reference to a predetermined Hidden Markov Model and the total tree diagram of the word dictionary obtained by said word clustering means, and for outputting a result of the speech recognition, wherein said word clustering means comprises:

first storage means for storing class words within one window;

second storage means for storing a plurality of c classes of the middle layer;

third storage means for storing the tree diagram of the upper layer;

fourth storage means for storing the tree diagram of the lower layer;

fifth storage means for storing the total tree diagram;

first control means for detecting an appearance frequency of a plurality of v words which are different from one another in text data including a plurality of words, for arranging the v words in a descending order of appearance frequency, and for assigning the v words to a plurality of v classes;

second control means for storing as class words within one window into said first storage means, words of (c+1) classes having a high appearance frequency, the number (c+1) smaller than v, among the v words of the plurality of v classes assigned by said first control means;

third control means, in response to the class words within one window stored in said first storage means, for clustering the class words into a plurality of c classes in a predetermined binary tree form, so that a predetermined average mutual information is maximized, the average mutual information representing a relative frequency rate of a probability when words of a first class and words of a second class which are different from each other appear adjacent to each other, with respect to a product of the appearance frequency of the words of the first class and the appearance frequency of the words of the second class, and for storing the plurality of clustered c classes as a plurality of c classes of the middle layer, into said second storage means;

fourth control means, in response to the plurality of c classes of the middle layer stored in said second storage means, for clustering the words of the plurality of clustered c classes of the middle layer in a binary tree form until the words of the middle layer are clustered into one class so that the average mutual information is maximized, and for storing a result of the clustering as the tree diagram of the upper layer into said third storage means;

fifth control means, in response to the plurality of words in each of the plurality of c classes of the middle layer stored in said second storage means, for clustering the plurality of words of each class of the middle layer into a binary tree form until the words of each class of the middle layer are clustered into one class every class of the plurality of c classes of the middle layer stored in said second storage means so that the average mutual information is maximized, and for storing a result of the clustering for each class as the tree diagram of the lower layer into said fourth storage means; and sixth control means for obtaining the total tree diagram including the tree diagrams of the upper layer, the middle layer and the lower layer by connecting the tree diagram of the lower layer stored in said fourth storage means to the plurality of c classes of the middle layer stored in said second storage means, and connecting the tree diagram of the upper layer stored in said third storage means to the plurality of c classes of the middle layer stored in said second storage means, and for storing a resulting total tree diagram as a word clustering result into said fifth storage means.

4. The speech recognition apparatus as claimed in claim 3,
wherein, when a class exists outside the one window stored in said first storage means or when the number of classes existing within the one window is not c, said third control means inserts words of a class which exists outside the current window and has a maximum appearance frequency into said window, and thereafter clusters the class words within one window into a plurality of c classes in the binary tree form.

5. A method for clustering a plurality of words and obtaining a total tree diagram representing a word clustering result, said total tree diagram including tree diagrams of an upper layer, a middle layer and a lower layer, said method including the following steps: detecting an appearance frequency of a plurality of v words which are different from one another in text data including a plurality of words, arranging the v words in a descending order of appearance frequency, and assigning the v words to a plurality of v classes; storing as class words within one window into first storage means, words of (c+1) classes having a high appearance frequency, the number (c+1) smaller than v, among the v words assigned into the plurality of v classes;

in response to the class words within one window stored in said first storage means, clustering the class words within one window into a plurality of c classes in a predetermined binary tree form, so that a predetermined average mutual information is maximized, the average mutual information representing a relative frequency rate of a probability when words of a first class and words of a second class which are different from each other appear adjacent to each other, with respect to a product of the appearance frequency of the words of the first class and the appearance frequency of the words of the second class, and storing the plurality of clustered c classes as a plurality of c classes of the middle layer, into second storage means;

in response to the plurality of c classes of the middle layer stored in said second storage means, clustering the words of the plurality of clustered c classes of the middle layer in a binary tree form until the words of the middle layer are clustered into one class so that the average mutual information is maximized, and storing a result of the clustering as the tree diagram of the upper layer into third storage means;

in response to the plurality of words in each of the plurality of c classes of the middle layer stored in said second storage means, clustering the plurality of words of each class of the middle layer into a binary tree form until the words of each class of the middle layer are clustered into one class, for every class of the plurality of c classes of the middle layer stored in said second storage means so that the average mutual information is maximized, and storing a result of the clustering for each class as the tree diagram of the lower layer into fourth storage means; and obtaining the total tree diagram including the tree diagrams of the upper layer, the middle layer and the lower layer by connecting the tree diagram of the lower layer stored in said fourth storage means to the plurality of c classes of the middle layer stored in said second storage means, and connecting the tree diagram of the upper layer stored in said third storage means to the plurality of c classes of the middle layer stored in said second storage means, and storing a resulting total tree diagram as a word clustering result into fifth storage means.

6. The method as claimed in claim 5,
wherein, when a class exists outside the one window stored in said first storage means or when the number of classes existing within the one window is not c, said clustering the class words within one window step includes the following steps of:
inserting words of a class which exists outside the current window and has a maximum appearance frequency into said window, and
thereafter clustering the class words within one window into a plurality of c classes in the binary tree form.

* * * * *